United States Patent
Shoji et al.

(10) Patent No.: US 9,617,077 B2
(45) Date of Patent: Apr. 11, 2017

(54) CONVEYOR BELT AND DRIVE BELT COMPRISING KNITTED BELT, AND CONVEYOR DEVICE USING CONVEYOR BELT

(71) Applicants: Susumu Shoji, Kobe (JP); Kazuro Fukui, Kobe (JP); Takaomi Kurahashi, Ayabe (JP); Masato Iida, Ayabe (JP)

(72) Inventors: Susumu Shoji, Kobe (JP); Kazuro Fukui, Kobe (JP); Takaomi Kurahashi, Ayabe (JP); Masato Iida, Ayabe (JP)

(73) Assignees: Sanwa Techno Co., Ltd., Hyogo (JP); Susumu Shoji, Hyogo (JP)

( * ) Notice: Subject to any disclaimer, the term of this patent is extended or adjusted under 35 U.S.C. 154(b) by 0 days.

(21) Appl. No.: 14/432,154

(22) PCT Filed: Sep. 28, 2012

(86) PCT No.: PCT/JP2012/075026
§ 371 (c)(1),
(2) Date: Mar. 27, 2015

(87) PCT Pub. No.: WO2014/049816
PCT Pub. Date: Apr. 3, 2014

(65) Prior Publication Data
US 2015/0246776 A1    Sep. 3, 2015

(51) Int. Cl.
*B65G 15/54*    (2006.01)
*B65H 5/02*    (2006.01)
*F16G 1/04*    (2006.01)

(52) U.S. Cl.
CPC .............. *B65G 15/54* (2013.01); *B65H 5/02* (2013.01); *F16G 1/04* (2013.01); *B65H 2404/271* (2013.01)

(58) Field of Classification Search
CPC ....... B65H 5/02; B65H 2404/271; F16G 1/04; B65G 15/54; B65G 15/16
(Continued)

(56) References Cited

U.S. PATENT DOCUMENTS

| 7,404,429 | B2 * | 7/2008 | Graichen | D04B 19/00 160/178.1 V |
| 7,523,626 | B2 * | 4/2009 | Enzien | B29D 29/06 66/195 |
| 8,783,448 | B2 * | 7/2014 | Shoji | B65G 15/54 198/844.1 |

FOREIGN PATENT DOCUMENTS

| JP | 59-053701 A | 3/1984 |
| JP | 61-200811 U | 12/1986 |

(Continued)

OTHER PUBLICATIONS

International Search Report dated Nov. 6, 2012, issued in corresponding application No. PCT/JP2012/075026.

*Primary Examiner* — Mark A Deuble
(74) *Attorney, Agent, or Firm* — Westerman, Hattori, Daniels & Adrian, LLP

(57) ABSTRACT

(PROBLEM) To provide a seamless conveyor belt comprising knit fabric.
(SOLUTION MEANS) A seamless conveyor belt employing monofilament made up of continuous fiber at filament constituting core yarn; being made up of weft-knit or warp-knit in which there is mutual intertwining of filament; flexural stress and heat causing monofilament at core yarn to undergo plastic deformation at locations of entanglement; being a seamless knit belt (1a) comprising a knit pattern (8) which is weft-knit or warp-knit; being a knit pattern (8) in which pitch (Ps) of stitch loops in a width direction (18) is smaller than pitch (Pg) of stitch loops in a conveying direction (17) of the seamless knit belt; mutually contacting (Continued)

loops (9) and filament undergoing deformation; entangled regions of filament being maintained; fraying at side ends of the knit belt (1a) during conveyance by the conveyor belt being prevented; spacing of pitch (Ps) of stitch loops in the width direction (18) being small; and strength being improved.

13 Claims, 20 Drawing Sheets

(58) Field of Classification Search
USPC .................................... 198/844.1, 846, 847
See application file for complete search history.

(56) References Cited

FOREIGN PATENT DOCUMENTS

| | | |
|---|---|---|
| JP | 63-139248 U | 9/1988 |
| JP | 03-118917 U | 12/1991 |
| JP | 05-011377 U | 2/1993 |
| JP | 2000-155404 A | 6/2000 |
| JP | 2000-191175 A | 7/2000 |
| JP | 2002-235251 A | 8/2002 |
| JP | 2007-308819 A | 11/2007 |
| JP | 2009-149440 A | 7/2009 |
| JP | 2009-184793 A | 8/2009 |

* cited by examiner

Warp-knit examples (a)            (b)

FIG. 15
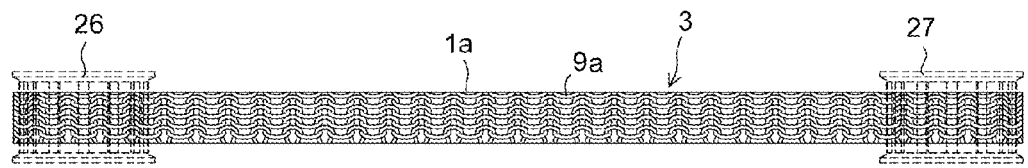
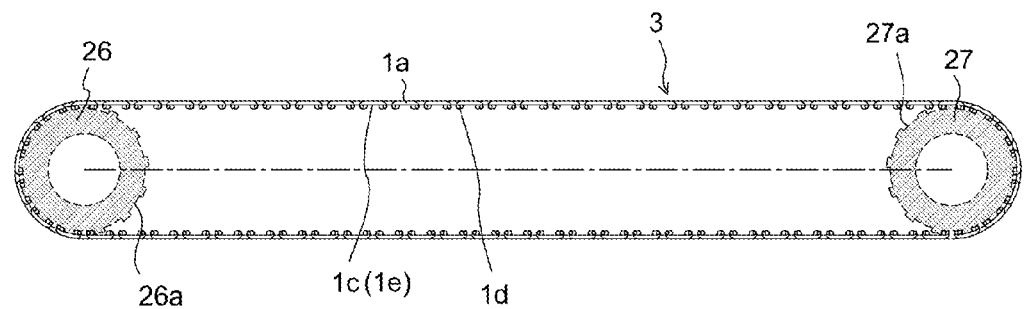
FIG. 16
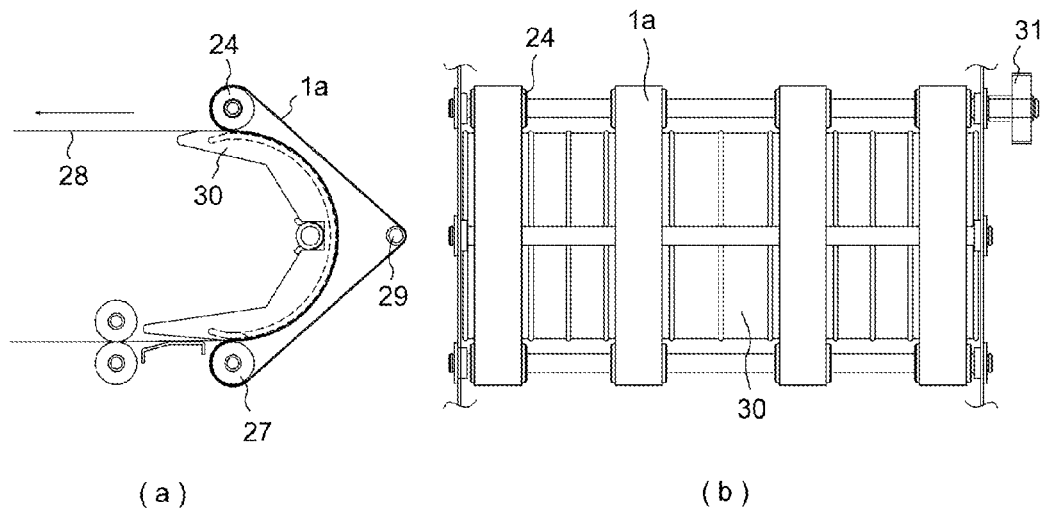
(a)  (b)

(Comparative examples)

(a)  (b)  (c)  (d)

(Comparative examples)

(Comparative examples)

(a)

(b)

(c)

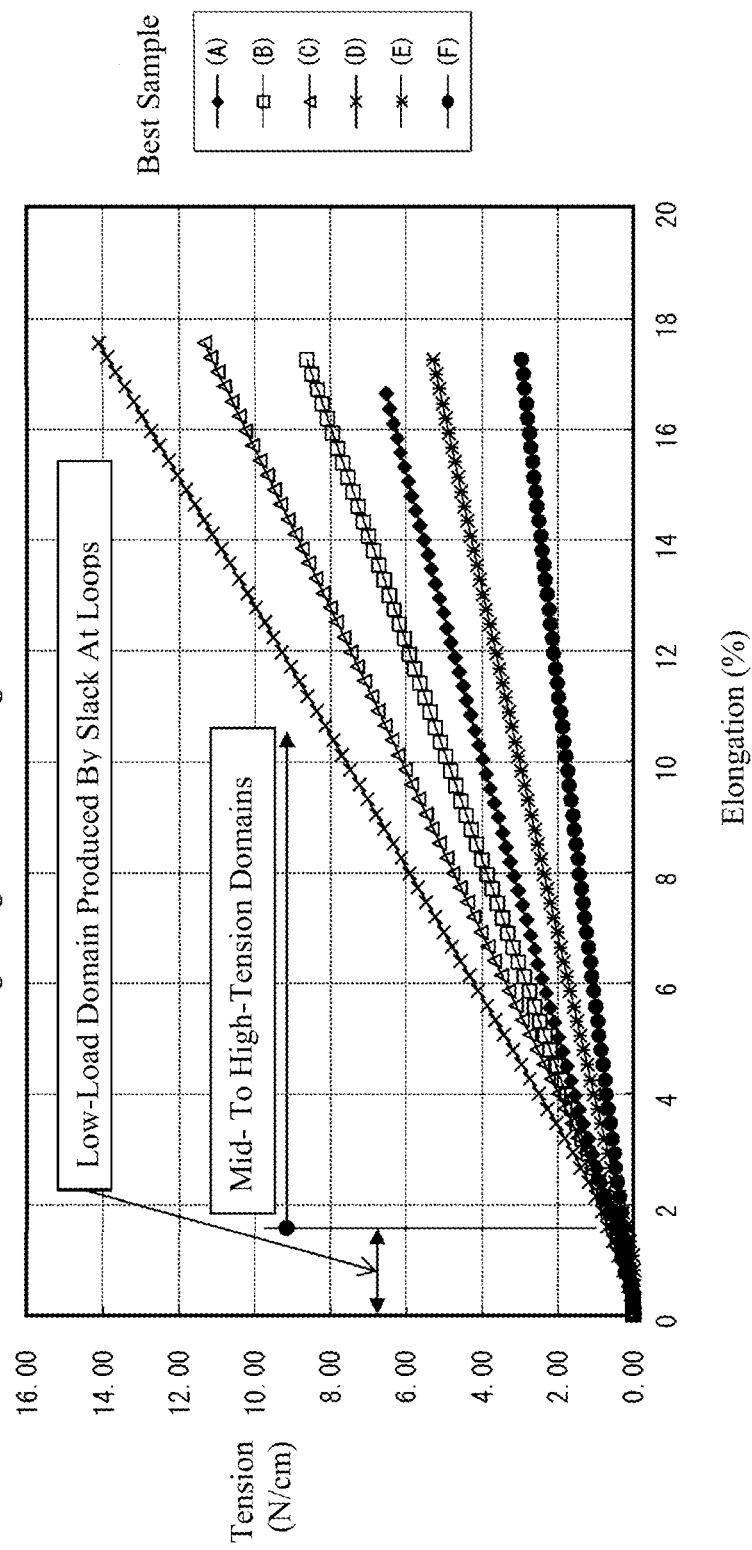

CONVEYOR BELT AND DRIVE BELT COMPRISING KNITTED BELT, AND CONVEYOR DEVICE USING CONVEYOR BELT

TECHNICAL FIELD

This invention relates to a drive belt that transmits drive force or a conveyor belt that conveys a lightweight sheet-like object, lightweight pill, or granule-like object. It is generally the case, during use of a conveyor belt to convey at high speed any of a variety of medicinal pills or any of various other such small objects or any of a variety of separate sheets of sheet-like papers, that the paper or small object, being lightweight, is while being conveyed apt to float, which can prevent it from being conveyed in its proper orientation. The present invention therefore relates to a drive belt which drives at high speed or to a conveyor belt that has a structure such as will, when conveying such lightweight and/or small objects at high speed, prevent such small objects from floating above the conveyor belt and allow them to be conveyed in their proper orientations, or has a structure such as will allow conveyed objects to be sandwiched as they are conveyed, the belt material comprising weft-knit and/or warp-knit knit fabric, and having air permeability by virtue of the loops that form the knit fabric, and in particular relates to a drive belt or a conveyor belt that permits improvement in belt strength and prevents fraying of belt side end(s) when the belt is in use.

BACKGROUND ART

In the context of conventional woven belts comprising woven fabric or conventional knit belts comprising knit fabric, where these are formed such that the entirety is of mesh construction, there has been occurrence of fraying of yarn at belt side ends or at locations where the belt is rubbed. And when an endless belt is formed from woven fabric or knit fabric, this has typically been done by causing the two ends in the long direction of the belt to be joined together so as to form the endless belt. However, when such an endless belt comprising woven fabric or knit fabric has been driven, it is sometimes the case that the endless belt undergoes lateral displacement and meanders. The belt might therefore be provided with a guide member so as to prevent such meandering. However, steps comprising projections and recesses which are parallel to the direction of travel and which might serve as guides with respect to the direction of travel have typically not been provided at the belt itself. Such belts have therefore been subjected to secondary processing where guides in the direction of travel were to be provided. However, there has been the problem that employment of secondary processing for provision of such guides has resulted in increased manufacturing cost.

Furthermore, the strength of a mesh belt, i.e., a belt which is such that the entire surface of the belt which comprises woven fabric or knit fabric is made of mesh, cannot ordinarily be described as adequate. To increase mesh belt strength, mesh belts have therefore been formed in such fashion that the material from which the mesh belt is formed by weaving or knitting has been yarn which is extremely thick. There are also rubber-coated belts; i.e., belts which are such that the surface of the material which comprises woven fabric or knit fabric is coated with rubber. However, where such rubber-coated belts have been employed, it has been necessary to carry out processing so that the belt could be provided with holes at rubber-coated portions so as not to defeat the purpose of the underlying mesh, which has increased cost. Thus, rubber-coated laminated belts comprising rubber elastic bodies and woven fabric or knit fabric (hereinafter these are referred to collectively as "woven/knit fabric") are expensive.

Because knit fabric is typically of high flexibility, belts made up of only knit fabric are almost never found. Furthermore, because belts comprising knit fabric have high flexibility, preventing attainment of sufficient belt tension, and because the coefficient of friction of the belt is moreover low, causing the gripping force produced by the force of friction to be inadequate, it is necessary to apply a rubber coating or the like to the surface of the belt as described above so that an adequate gripping force due to the force of friction can be obtained. Moreover, with conventional belts comprising woven/knit fabric, there have been problems such as the fact that there is fraying of yarn at belt side ends, or there is breakage of yarn where the belt is rubbed, and that this causes a run in the material from that point, as a result of which the belt is immediately made unfit in use.

Belts in which the mesh belt side ends have been subjected to certain processing have been proposed as solution to the problem of fraying of yarn at side ends in such mesh belts comprising woven/knit fabric. To wit, a belt has been proposed in which reinforcing synthetic fiber fabric is made to fuse with and cover the ends on either side of a mesh belt woven from yarn comprising synthetic fibers (see, for example, Patent Reference No. 1).

Moreover, a belt employing knit fabric has been disclosed that is a belt in which a rubber elastic body is laminated to one side of flexible knit cloth (e.g., see Patent Reference No. 2).

Furthermore, a conveyor belt has been proposed which has a belt core that is woven in mesh-like fashion from glass fibers, the belt being such that a plurality of seal strips formed from resin or flexible material are integrally provided in row-like fashion in the conveying direction, being formed so as to protrude from the inner and outer surfaces thereof, with the belt side ends being moreover reinforced with fabric or other such reinforcing material in such fashion as to straddle the belt core (see, for example, Patent Reference No. 3).

Moreover, a filter mesh belt has been proposed which is formed from a mesh portion formed between portions at the sides formed in the long direction and a plurality of reinforcing portions arranged so as to cross this mesh portion, these side portions and these reinforcing portions being woven more tightly than the mesh portion and being imparted with more rigidity than the mesh portion, and which is moreover such that hot-melt fibers are woven into the side portions and reinforcing portions, application of heat treatment thereto causing these to be molded together in integral fashion to form an integrally molded belt (see, for example, Patent Reference No. 4).

Furthermore, a mesh belt has been proposed in which the warp yarns are parallel to the conveying direction and are of thickness 1 mm to 2 mm, and in which the weft yarns perpendicular to these warp yarns are 0.1 mm to 0.5 mm in diameter, the warp yarns being made thicker than the weft yarns so as to achieve improved strength and endurance, and in which the mesh belt which has been made to have a mesh opening ratio of 15% to 40% is moreover coated or impregnated with silicone rubber to form the belt (see, for example, Patent Reference No. 5).

Moreover, a belt has been proposed which comprises a solid belt, holes for air permeability having been formed in this solid belt, irregular groove shapes parallel to the belt conveying direction being present, height of the irregular groove shapes being not less than 0.1 mm, the irregular shapes repeating with a periodicity that is not less than 1 mm, height of unevenness in paper which is the object to be conveyed being reduced by suction means (see, for example, Patent Reference No. 6).

Moreover, a transport belt has been proposed which is such that an air-permeable transport belt comprising a mesh belt is formed from yarns comprising fiber strands of twisted yarn in a vertical direction extending in the transport direction, and cross yarns intersecting these yarns comprising fiber strands in the vertical direction and extending in such fashion as to cross the transport direction, the gap between the yarns comprising fiber strands in the vertical direction being larger than the gap between weft yarns, i.e., between the cross yarns in the horizontal direction (see, for example, Patent Reference No. 7).

Furthermore, as fabric for clothing, a fabric has been proposed in which rib stitching is carried out using a ground yarn comprising acrylic yarn, yarn which is a mixture of cotton and polyester, cotton yarn, and polyester yarn, and polyolefin yarn which exhibits plastic deformation and which is comparatively thin is made to serve as plating yarn with respect to this ground yarn, plating being carried out by knitting this into the entire surface of the acrylic ground yarn in such fashion that the polyolefin plating yarn does not emerge from the face side, to form fabric having good shape retention (see, for example, Patent Reference No. 8).

Moreover, a conveyor belt has been proposed in which the surface of a belt having a knitted stitch structure is imparted with the slip-preventing capability of rubber elasticity (e.g., see Patent Reference No. 9).

Furthermore and in addition, a belt is proposed which is a conveyor belt comprising mesh formed from cloth made in plain weave, wherein the mesh pitch is set so as to be 100 to 170 μm, more solid yarn than twisted yarn is employed, and the difference in height between warp yarns and weft yarns where fibers intersect is set so as to be 20 to 100 μm (see, for example, Patent Reference No. 10).

Moreover, in the context of a method for manufacturing stockinette hosiery, a technique has been proposed in which heat sufficient to cause fusing of hot-melt yarn but insufficient to cause melting of heat-shrink yarn is applied to knitted cloth comprising such yarns so as to cause the knitted cloth to shrink and so as to also cause adhesion at the hot-melt yarn to prevent fraying of stitches (see, for example, Patent Reference No. 11).

PRIOR ART REFERENCES

Patent References

Patent Reference No. 1: Japanese Utility Model Application Publication Kokai No. S61[1986]-200811
Patent Reference No. 2: Japanese Utility Model Application Publication Kokai No. S63[1988]-139248
Patent Reference No. 3: Japanese Utility Model Application Publication Kokai No. H3[1991]-118917
Patent Reference No. 4: Japanese Utility Model Application Publication Kokai No. H5[1993]-19377
Patent Reference No. 5: Japanese Patent Application Publication Kokai No. 2000-155404
Patent Reference No. 6: Japanese Patent Application Publication Kokai No. 2000-191175
Patent Reference No. 7: Japanese Patent Application Publication Kokai No. 2002-235251
Patent Reference No. 8: Japanese Patent Application Publication Kokai No. 2007-308819
Patent Reference No. 9: Japanese Patent Application Publication Kokai No. 2009-149440
Patent Reference No. 10: Japanese Patent Application Publication Kokai No. 2009-184793
Patent Reference No. 11: Japanese Patent Application Publication Kokai No. S59[1984]-53701

SUMMARY OF INVENTION

Problem to be Solved by Invention

As can be seen in the conventional art, belts of mesh construction constituted from woven fabric require strategies for prevention of fraying at belt side ends corresponding to edges of woven fabric, improvement of strength, prevention of lateral displacement, and so forth. However, because such prevention of fraying requires secondary processing and reinforcing members, it has resulted in increased cost. Furthermore, because warp yarn diameter is large, being 1 to 2 mm, this has caused it to lack flexibility as a belt, and to be inferior with respect to mesh strength and endurance, as was the case with the conventional art. Moreover, where belts are constituted from knit fabric, because knit fabrics are flexible, these have been made suitable for use as a result of lamination of a rubber elastic body thereto. Furthermore, belts comprising knit fabric permit achievement of tension by means of yarn thickness, loop size, and loop density; it being possible to obtain elongation at low tension when yarn thickness is small, loop size is large, and loop density is low. However, where belts comprising knit fabric are employed as conveyor belts or the like, if the belt is held under low tension, this can cause occurrence of slack in the space between the mutual tensioning of the rollers; moreover, low tension at a belt comprising knit fabric can cause force of friction (gripping characteristics) with respect to the drive roller that drives the knit belt to become low, as a result of which slippage may occur between the belt and the belt drive roller. Furthermore, if the coefficient of friction at the belt surface is low, this may cause occurrence of slippage between it and a conveyed object. Accordingly, with a belt comprising knit fabric, it is necessary that slack in the belt be at a permissible level, and that tension and the coefficient of friction of the belt be such as to permit attainment of an appropriate force of friction (gripping). However, with conventional belts comprising knit fabric, it has been the situation that adequate tension cannot be obtained. Moreover, where tension in a belt of mesh construction comprising knit fabric has been obtained by stretching the belt, there has been the problem that the width of the belt has become too small.

A problem to be solved by the present invention is the provision of a seamless conveyor belt comprising knit fabric which is a conveyor belt and a drive belt comprising knit fabric unavailable conventionally; which, while having air permeability due to knit fabric loops, can be held under tension at a tension causing slack in the belt to be at a permissible level; which is a belt permitting attainment of tension necessary for driving the belt and gripping characteristics with respect to a drive roller; and for which there is moreover little change in the belt width direction when held under tension; which is a belt permitting prevention of fraying of belt side ends and fraying due to breakage of yarn as a result of abrasion or the like during operation of the conveyor belt; which furthermore is a belt permitting adequate improvement of belt strength and prevention of upward curling of belt side ends; which moreover is a belt capable of conveying an object while carrying out removal of charge that has accumulated at the object while it is being conveyed thereon; and which in addition to the foregoing, as a result of causing projecting regions due to regions produced by entanglement of knitting yarn to be provided on the front surface and the back surface of a conveyor belt, is a conveyor belt constituted so as to arbitrarily permit prevention of upward curling at belt side ends and prevention of downward curling at belt side ends; and in addition, being a belt constituted so as to reduce slack in loops, is a belt permitting attainment of appropriate tension; and moreover in which, by increasing the diameter of knitting yarn to increase height of projecting regions due to entanglement, possesses steps permitting transmission of drive force; and which is such that, by causing loops due to knitting yarn to be made approximately rectilinear, makes it possible to form steps of prescribed spacing and obtain functionality as a drive belt.

Means for Solving Problem

Of the means in accordance with the present invention for solving the foregoing problems, in the context of a conveyor belt having air permeability that conveys paper and sheet-like objects or three-dimensional objects, a first means is such that filament of yarn comprising filament constituting core yarn is filament made up of continuous fiber; being a knit belt made up of knit fabric which is weft-knit or warp-knit and in which there is mutual intertwining of filament. Dimensions of adjacent loops in a gauge direction which is a conveying direction of this knit belt possess dimensions of loops of different sizes; being a knit pattern in which pitch Ps of loops in an axial direction, i.e., stitch direction, which is a width direction, is smaller than pitch Pg of loops in the gauge direction. In addition, loops at stitches coming in mutual contact in this conveying direction are small loops comprising loops of small size and large loops comprising loops of large size. Moreover, plastic deformation of filament at locations at which filament is entangled causes an entangled state to be maintained at filament of loops; being a knit belt in which slack which is amount of looping at large loops is small; and in addition, being a seamless knit belt having a knit pattern which is weft-knit or warp-knit and in which small loops approach, or come in contact with, knitting yarn in the belt width direction which is the stitch direction; plastic deformation occurring due to mutual intertwining of filament; fraying of yarn due to rubbing or the like at side ends and breakage of yarn at mutual monofilament locations due to abrasion during driving or conveying of the belt being prevented; and in addition, pitch spacing in the stitch direction being shortened; and strength in the conveying direction, which is to say the drive direction, being improved. This means is a seamless conveyor belt comprising a knit belt characterized by the foregoing.

A second means is such that the conveyor belt which comprises knit fabric which is weft-knit or warp-knit has gaps that are produced by the knit fabric; and core yarn at the knitting yarn employed in the knit fabric is knitting yarn comprising monofilament, flexural stress or heat causing the monofilament knitting yarn to undergo plastic deformation at stitch loop locations where this knitting yarn monofilament mutually intersects and becomes entangled, or the knitting yarn employed in the knit fabric is knitting yarn comprising a plurality of filaments, flexural stress or heat causing the knitting yarn, there being filament exhibiting plastic deformation included among the plurality of filaments, to undergo plastic deformation at stitch loop locations where the plurality of filaments of this knitting yarn mutually intersect and become entangled, such that the entangled state is maintained; and in addition, the knit belt is such that slack at loops and stitches has been stabilized due to heat-setting. This means is a seamless conveyor belt comprising knit fabric according to the second means characterized by the foregoing.

A third means is such that a knit belt is knit from a plurality of materials; filament constituting core yarn being knitting yarn comprising monofilament; knit fabric being such that knitting yarn is mutually intertwined therein. In addition, flexural stress, heat, and/or the like causes the monofilament of the core yarn to undergo plastic deformation at locations of entanglement; being a knit pattern in which pitch of loops in an axial direction, i.e., a stitch direction constituting a width direction, is smaller than pitch of loops in a gauge direction constituting a conveying direction of this knit belt; mutually contacting loops and filament being made to undergo deformation such that an entangled state of the filament is moreover maintained; prevention of fraying at belt side ends during conveying by the conveyor belt and shortening of pitch spacing in the stitch direction causing improvement of strength in the conveying direction. Moreover, it is a seamless knit belt which, being a knit belt comprising a plurality of materials, comprises knit fabric which is formed by knitting in accordance with any one knitting method among three knitting methods, these being plating using a core yarn and a yarn which comprises filament of material different from this core yarn as a plating yarn with which the core yarn is plated; knitting using knitting yarn that is twisted yarn in which there is a core yarn and a yarn which comprises filament of material different from this core yarn and which is twisted thereabout; and knitting using knitting yarn that is covered yarn in which a core yarn is covered by a yarn which comprises filament different from this core yarn. Moreover, it comprises a knit belt in which a front surface and a back surface of this knit belt have different coefficients of friction or in which the front surface and the back surface of this knit belt have the same coefficient of friction. This means is a seamless conveyor belt comprising a knit belt according to the second means characterized by the foregoing.

A fourth means is such that the knit belt, in which prevention of fraying of yarn of the knit belt and use of knitting yarn to cause coefficient of friction at the knit belt to be different coefficients of friction at front and back or more or less the same coefficient of friction at front and back have been carried out, is such that monofilament yarn made up of artificial-fiber continuous fiber is used as core yarn; being a seamless knit belt comprising warp-knit or weft-knit in which filament is mutually intertwined. In addition, the monofilament of this core yarn is monofilament comprising artificial fiber, being yarn comprising high-resistance, i.e., highly insulating, monofilament or electrically conductive filament comprising artificial fiber; being a knit belt which is knit using yarn in which the knitting yarn within which this core yarn is included comprises filament of at least two or more different materials; and in addition, reduction in pitch spacing in the stitch direction causes improvement in strength in the conveying direction; being a seamless knit belt comprising knit fabric chosen from among plating in which a yarn that comprises filament of material different from, and having higher coefficient of friction than a coefficient of friction of, a core yarn is used as a plating yarn for plating; knitting using knitting yarn that is twisted yarn in which there is a core yarn and a yarn which comprises filament of material different from, and having higher coefficient of friction than a coefficient of friction of, this core yarn and which is twisted thereabout; and knitting using knitting yarn that is covered yarn in which a core yarn is covered by filament of material different from, and having higher coefficient of friction than a coefficient of friction of, this core yarn. Moreover, it comprises a knit belt in which a front surface and a back surface of this knit belt have different coefficients of friction or in which the front surface and the back surface of the knit belt have the same coefficient of friction. This means is a seamless conveyor belt comprising a knit belt according to the third means characterized by the foregoing.

A fifth means is such that yarn constituting the knit belt employs a core yarn and filament comprising flexible elastic fiber having coefficient of friction higher than coefficient of friction of the core yarn; and there is improvement in coefficient of friction of the knit belt. As a result of this improvement, there is increase in a force of friction (gripping force) which is at least one of a force of friction (gripping force) between a conveyor belt comprising the knit belt and a conveyed object placed on or sandwiched by the conveyor belt comprising this knit belt, and a force of friction (gripping force) between a conveyor belt comprising a knit belt and a drive roller with which the conveyor belt comprising this knit belt is driven. This means is a seamless conveyor belt comprising a knit belt according to the fourth means characterized by the foregoing.

A sixth means is such that a force of friction (gripping force) between a conveyor belt comprising the knit belt and a conveyed object placed on or sandwiched by the conveyor belt comprising this knit belt is such that at least one of elastic-fiber filament which is knitting yarn and monofilament constituting core yarn is shaped so as to be of modified cross-section. In addition, the shape of this modified cross-section is a modified cross-sectional shape that causes increase in contact area with respect to at least one of a conveyed object that is placed on or sandwiched by the conveyor belt comprising the knit belt and a drive roller that drives a drive belt. This means is a seamless conveyor belt comprising a knit belt according to the fifth means characterized by the foregoing.

A seventh means is such that the knitting yarn comprises monofilament made up of core yarn and filament which is elastic fiber; at least one of the two being shaped so as to be of modified cross-section; the knitting yarn being such that elastic fiber different from the core yarn includes elastic-fiber filament of melting point lower than a melting point of the core yarn comprising monofilament. In addition, flexural stress or heat cause the knitting yarn to undergo deformation at a time when this knitting yarn is used to knit the knit belt; heat-setting moreover causing the low-melting-point elastic fiber to fuse to the core yarn; a state in which knitting yarn intersects and is entangled is stabilized; improvement of coefficient of friction of the knit belt and prevention of fraying of filament of knitting yarn at side ends and breakage of yarn due to abrasion of the knit belt being respectively achieved; there being an increase in regions at which contact with a conveyed object occurs; and there being improvement in conveying force. This means is a seamless conveyor belt comprising a knit belt according to the fourth through sixth means characterized by the foregoing.

An eighth means is such that knitting yarn is knitting yarn comprising filament which is a dielectric body or an insulating body and monofilament constituting core yarn is electrically conductive filament which comprises comprising artificial fiber. In addition, flexural stress or heat causes this monofilament to undergo plastic deformation at locations of entanglement. Moreover, being knit in a knit pattern which is weft-knit or warp-knit, the seamless knit belt which comprises conditions causing loops to have undergone deformation is such that it is a knit pattern in which pitch of loops in a stitch direction constituting an axial direction is smaller than pitch of loops in a gauge direction constituting a conveying direction; and at this knit pattern, mutual filament locations and mutual locations of mutually adjacent loops have undergone deformation and an entangled state of the filament is maintained, causing prevention of fraying of side ends of the knit belt during conveyance by the conveyor belt; and pitch spacing of loops in the stitch direction is shortened. In addition, shortening of this pitch spacing causes increase in strength in the conveying direction; and the knit belt comprises knitting yarn in which filament comprising a dielectric body or an insulating body covers the core yarn or in which plating yarn in which filament comprising a dielectric body or an insulating body is plated over the core yarn so as to prevent direct contact with the core yarn which comprises electrically conductive filament. This yarn with which the core yarn is covered or this yarn with which the core yarn is plated is provided thereover at the knit belt; a desired gap being formed between the conveyed object and the core yarn comprising electrically conductive filament due to a thickness of the yarn comprising filament which is the dielectric body or the insulating body; and, at a conveyor apparatus at which this knit belt is used, the core yarn comprising electrically conductive filament from which the knit belt is constituted is made to be in one state among a state in which it is floating, a state in which it is grounded to earth, and a state in which a voltage is applied thereto. This means is a seamless conveyor belt comprising a knit belt according to the seventh means characterized by the foregoing.

A ninth means is such that yarn which covers the core yarn or yarn with which the core yarn is plated at the knit belt which is a conveyor belt is filament of flexible elastic fiber having a coefficient of friction higher than that of the core yarn and having a melting point lower than that of the core yarn; flexural stress or heat at a time when the knit belt is being knit causing the knitting yarn to deform; heat-setting following knitting causing filament of this elastic fiber to fuse to the core yarn; and the intersecting and entangled state of the knitting yarn which comprises filament being stabilized. In addition, as a result of this stabilization, the knitting yarn is such as to permit achievement of prevention of fraying of knitting yarn at side ends of the knit belt, and improvement in formation of friction at the knit belt, and electrostatic holding of a conveyed object thereto or removal of charge from a conveyed object by means of electrical action as a result of causing the core yarn which is electrically conductive filament at the knit belt to be in one state among a state in which it is floating, a state in which it is grounded to earth, and a state in which a voltage is applied thereto. This means is a seamless conveyor belt comprising a knit belt according to the eighth means characterized by the foregoing.

A tenth means arises in the context of a conveyor belt comprising a knit belt according to any one of the first through ninth means. Prevention of upward curling of side ends of the knit belt at this conveyor belt is formed from an entangled state of yarn comprising filament; projecting portions (hereinafter "projecting regions") due to said entanglement being arranged at least at the back surface, or being arranged at both the front surface and the back surface, of the knit belt. This means is a seamless conveyor belt comprising a knit belt characterized by the foregoing.

An eleventh means is a seamless knit belt which has been knit with pitch of prescribed gauge, and on the back surface of which there are provided projecting regions which are due to entanglement of knitting yarn in knit fabric at which mutual monofilament locations are mutually intertwined at a seamless conveyor belt comprising a knit belt according to the third means. This knit belt is such that diameter of knitting yarn causes formation of a height of a projecting region at the back surface of an entangled region; this height of the projecting region at the back surface causes a step to be provided between it and a non-entangled region; and a groove that engages with the projecting region formed by intertwining of knitting yarn at the projecting region on the back surface of this seamless knit belt is arranged on a drive roller by which the knit belt is driven as a result of this step that is provided at the back surface. A knit belt which is a drive belt for transmission of drive force is formed as a result of engagement between the groove which is arranged on this drive roller and the projecting region at the entangled region of this seamless knit belt. This means is a seamless drive belt comprising a knit belt characterized by the foregoing.

A twelfth means is a knit belt forming a drive belt that transmits drive force as a result of engagement between a groove formed in a drive roller and a projecting region at an entangled region of this seamless knit belt. This knit belt comprises knitting yarn containing a plurality of materials; monofilament made up of continuous fiber being used at filament constituting core yarn; being a seamless knit belt comprising knit fabric chosen from among plating using a core yarn and filament of material different from this core yarn for plating thereof; knitting knitted using knitting yarn which is twisted yarn in which there is a core yarn and filament of material different from this core yarn for twisting therewith; and knitting using knitting yarn which is covered yarn in which a core yarn is covered by filament of material different from this core yarn. In addition, it is a seamless knit belt in which a front surface of this knit belt and a back surface of this knit belt have different coefficients of friction or a seamless knit belt in which the front surface of the knit belt and the back surface of the knit belt have more or less the same coefficient of friction; and in particular, so as to increase force of friction (gripping characteristics) with respect to a pulley or roller by which drive force is transmitted by a belt and drive pulley or drive roller and the knit belt, it comprises a knit belt having improved gripping characteristics as a result of the fact that filament having higher coefficient of friction than a core yarn has been used as plating yarn to plate the core yarn, has been used as a result of having been included within twisting yarn, or has been used as covering yarn. This means is a drive belt comprising a seamless knit belt which is a knit belt characterized by the foregoing.

A thirteenth means is a means in which a conveyor belt comprising any one of the first through tenth means is applied for use in an apparatus having conveyor means that causes an object to be conveyed. This means is a conveyor apparatus employing a seamless conveyor belt comprising knit fabric characterized by the foregoing.

Benefit of the Invention

At the first means, a seamless knit belt which is a conveyor belt is such that adjacent loops in a gauge direction (conveying direction) comprise loops of two different sizes, these being large loops and small loops, the knit fabric being such that slack (amount of looping) of the large loops is small, there being little slack (amount of looping) at the knitting yarn, reducing elongation of the belt occurring due to slack at the knitting yarn, the constitution being such that it is primarily deformation of the small loops, which do not deform readily at low tension, that occurs for small percent elongations of the knit belt, the constitution allowing the necessary tension to be obtained; and in addition, there being little deformation of small loops in the belt width direction due to small loops when tension is being applied, the conveyor belt experiences little fluctuation in width. Moreover, fraying of yarn comprising filament due to plastic deformation of yarn at side ends of the knit belt or breakage of yarn at the knit belt is prevented; and moreover, reduction in pitch spacing in the stitch direction causes improvement in strength in the drive direction, which is the conveying direction. At the second means, flexural stress and/or heat at the time of knitting causes knitting yarn to undergo plastic deformation; and in addition, carrying out heat-setting following knitting reduces slack at large loops, stabilizing belt dimensions. Moreover, at the third means, knitting yarn is constituted from a plurality of filaments; filament of the core yarn, and filament of coefficient of friction different from the core yarn, being used; the belt being such that coefficient of friction at the front surface of the belt and coefficient of friction at the back surface of the belt are different or the knit belt having the same coefficient of friction at front and back. At the fourth means, because monofilament forming core yarn at knitting yarn is electrically conductive filament or insulating filament comprising artificial fiber, and because the knit fabric is formed such that filament of high coefficient of friction is included within knitting yarn, the conveyor belt comprising this knit belt has high gripping force with respect to conveyed objects, making it possible to convey conveyed objects in stable fashion, and permitting prevention of upward curling at the side ends of the knit belt, as well as fraying at side ends and/or breakage of yarn at the knit belt.

Moreover, at the fifth means, because a seamless knit belt which is a conveyor belt employs flexible elastic-fiber filament of high coefficient of friction, coefficient of friction of the knit belt is high, and there is improvement in the force of friction (gripping force) between it and a conveyed object and/or in the force of friction (gripping force) between it and a drive roller. At the sixth means, because this is formed from elastic-fiber filament of modified cross-sectional shape and/or core-yarn monofilament of modified cross-sectional shape, there is increase in the contact area corresponding to region(s) of contact with conveyed object(s) and/or drive roller(s). Furthermore, at the seventh means, heat-setting following formation of the knit belt makes it possible to cause low-melting-point filament to be fused to core yarn, making it possible to achieve stabilization of dimensions and improvement in coefficient of friction. Moreover, at the eighth means, by causing dielectric plating yarn or covering yarn to intervene between a core yarn employing electrically conductive filament and a conveyed object which has accumulated charge, it is possible, while the conveyed object is on the knit belt, to remove charge by means of gap discharge from the conveyed object that has accumulated charge. Furthermore, at the ninth means, use of flexible elastic fiber having high coefficient of friction, while facilitating knitting of the knit belt therewith, permits stabilization through heat-setting of elastic fiber following knitting, stabilizing the intersecting and entangled state of fiber and preventing fraying at side ends and breakage of yarn at the knit belt, and through utilization of electrically conductive core yarn also makes it possible to achieve removal of charge from conveyed objects or to by electrostatically holding them thereto achieve stabilization of conveyed objects. At the tenth means, because the seamless knit belt is such that projecting regions produced by entanglement of yarn are arranged on the back surface, this eliminates occurrence, at the front side of the knit belt, of upward curling of the side ends of the knit belt.

Moreover, at the eleventh means, because of deliberate provision of steps due to projecting regions at entangled regions of the knit belt, a seamless knit belt which is a drive belt is a conveyor belt having functionality as a drive belt in which engagement of these steps with a drive roller on which grooves have been formed permits increase in drive force. At the twelfth means, use of plating yarn of filament different from a core yarn, twisted yarn in which there is a core yarn and filament different from the core yarn twisted therewith, and/or covered yarn in which a core yarn is covered with filament different from the core yarn makes it possible for coefficients of friction to be made the same or different at the front side and the back side of the knit belt; and moreover, as a result of increase in the coefficient of friction of the knit belt, makes it possible to obtain a drive belt which is suitable for a variety of functions.

In addition, at the thirteenth means, this is a conveyor apparatus in which a belt according to the first through tenth means is used and is applied for use in an apparatus having conveyor means, being an apparatus capable of accurately conveying sheet-like objects or three-dimensional objects.

BRIEF DESCRIPTION OF THE DRAWINGS

FIG. 15 Shows schematic diagrams of a situation in which a knit belt in accordance with the present invention is used as a belt for transmission of drive force, (a) being a plan view, and (b) being a side view.

FIG. 16 Diagrams for reference for a conveyor apparatus in which conveyed objects (sheets) are conveyed in sandwiched fashion, (a) being a partial sectional view, and (b) being a plan view of the conveyor apparatus.

FIG. 22 Graph showing relationship between elongation and tension (per unit width) at a weft-knit belt in accordance with the present invention

EMBODIMENTS FOR CARRYING OUT THE INVENTION

Below, embodiments of the present invention are described with reference to tables and drawings.

Figure 18:
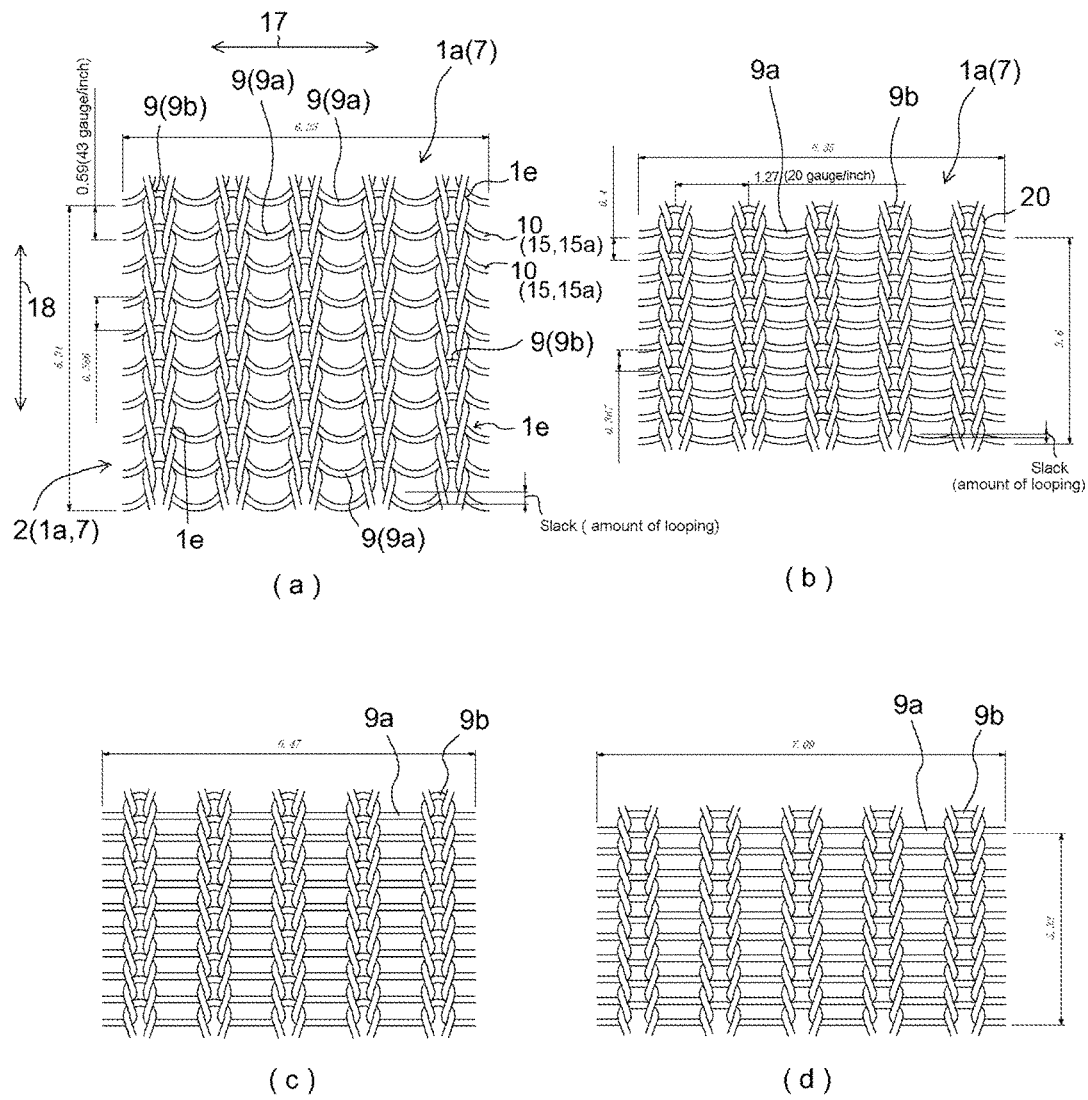
FIG. 18 Diagrams of knit fabric which is weft-knit and in which dimensions of adjacent loops in the gauge direction are different in accordance with the present invention, the diagram at (a) being a schematic view of small loop dimensions and large loop dimensions before plastic deformation has occurred; the diagram at (b) being a schematic view of stitches in which slack in small loop dimensions and in large loop dimensions has been reduced following plastic deformation; the diagram at (c) being a schematic view of the situation obtained when the knit fabric at (b) is held under tension and slack is at a minimum; and the diagram at (d) being a schematic view of the situation obtained when (b) is subjected to further tension, at which time production of tension is due to small loops, this schematic view illustrating that the amount of change in the width direction is small.

Describing an embodiment of a first means in accordance with the present invention, in FIG. 18, where the knit state of knit fabric 7 is such that there is change in dimensions of adjacent loops 9 in the gauge direction, i.e., conveying direction 17, of knit belt 1a, (a) at FIG. 18 shows knit fabric 7 having knit stitches comprising large loops 9a and small loops 9b in a state in which plastic deformation does not take place, and (b) at FIG. 18 is an example of stitches in a knit belt 1a in accordance with the present invention, being a knit belt 1a made from knit fabric 7 comprising large loops 9a and small loops 9b, and being constituted such that density of loops 9 in the stitch direction, i.e., width direction 18, of the belt is made to increase, the knitting yarn 10 is made to undergo plastic deformation at entangled regions 1e, deformation of large loops 9a is made larger than deformation of small loops 9b, and the amount of looping (slack) of large loops 9a is made small. The plastic deformation of knitting yarn 10 is plastic deformation due to heat and/or flexural stress applied to the yarn during knitting, and heat-setting is moreover carried out under conditions in which knit fabric 7 is held under tension following knitting, stabilizing the state by which knitting yarn 10 has been made to undergo plastic deformation and the state by which slack of large loops 9a has been made small, and causing stabilization of the dimensions of knit belt 1a, i.e., knit fabric 7.

Moreover, in the width direction 18, i.e., stitch direction, which is the axial direction, of knit belt 1a, density of small loops 9b is made to increase in the stitch direction so that small loops 9b approach and/or contact respective knitting yarns 10, being constituted such that a state is assumed in which, with the elongation in the gauge direction, i.e., conveying direction 17, there is mutual approach and/or contact of small loops 9b, the constitution being such that small loops 9b mutually impede one another in a direction that would otherwise tend to cause them to shrink, so that change of width in the width direction 18 is made small. These make the constitution such that elongation due to slack of large loops 9a at knitting yarn 10 is made small, it being primarily small loops 9b that deform when knit belt 1a is in a state in which there is little elongation thereat, permitting achievement of a tension that had not been possible conventionally. Moreover, the constitution is such that, in width direction 18, small loops 9b approach and/or contact knitting yarn 10, so that there is little deformation of loops 9, and contraction in the width direction 18 is made small.

Figure 6:
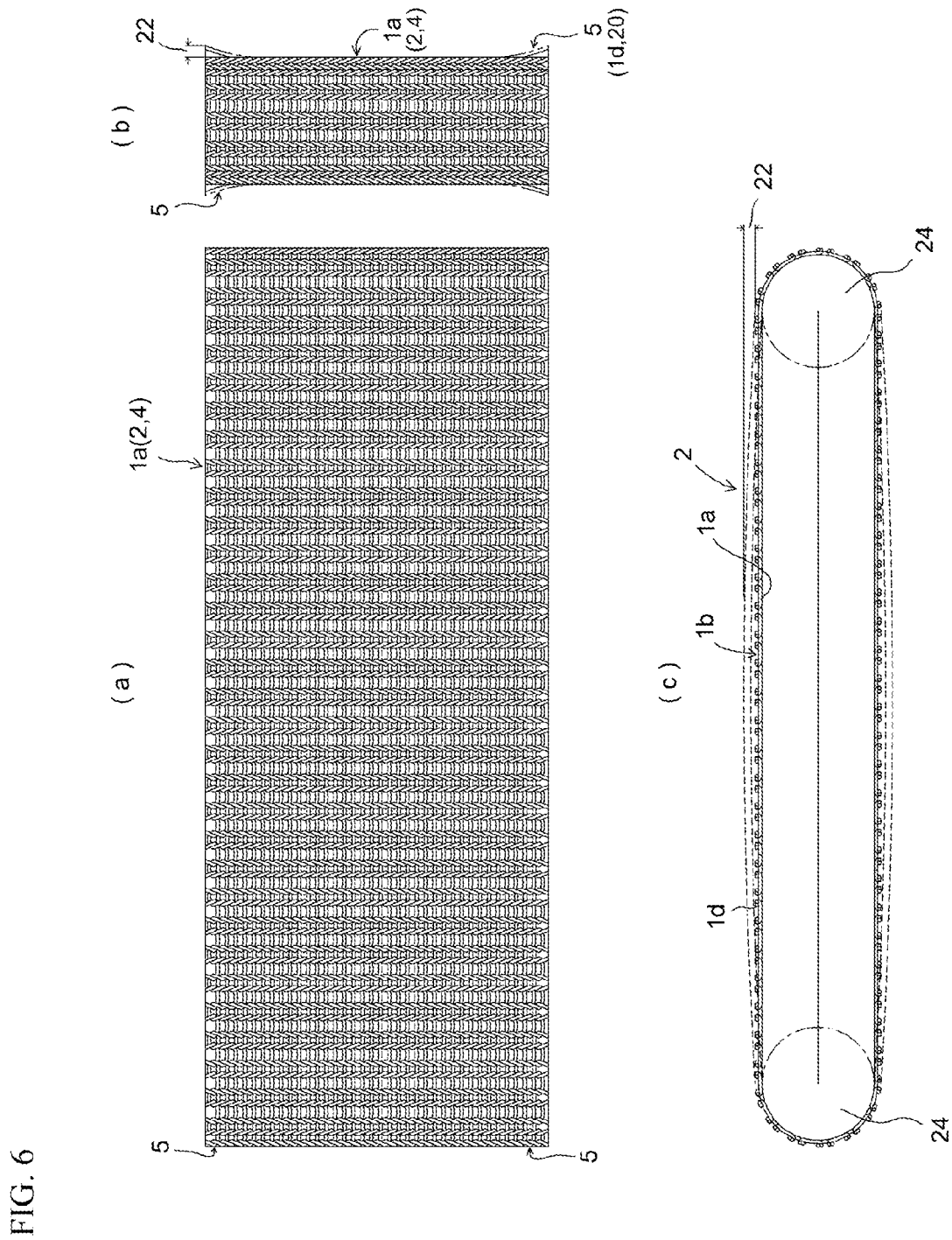
FIG. 6 Diagrams showing direction of upward curling at side ends when projecting portions produced by entanglement are at the front surface of a knit belt in accordance with the present invention, (a) being a plan view, (b) being a side view, and (c) being a schematic sectional view of (a).
Figure 7:
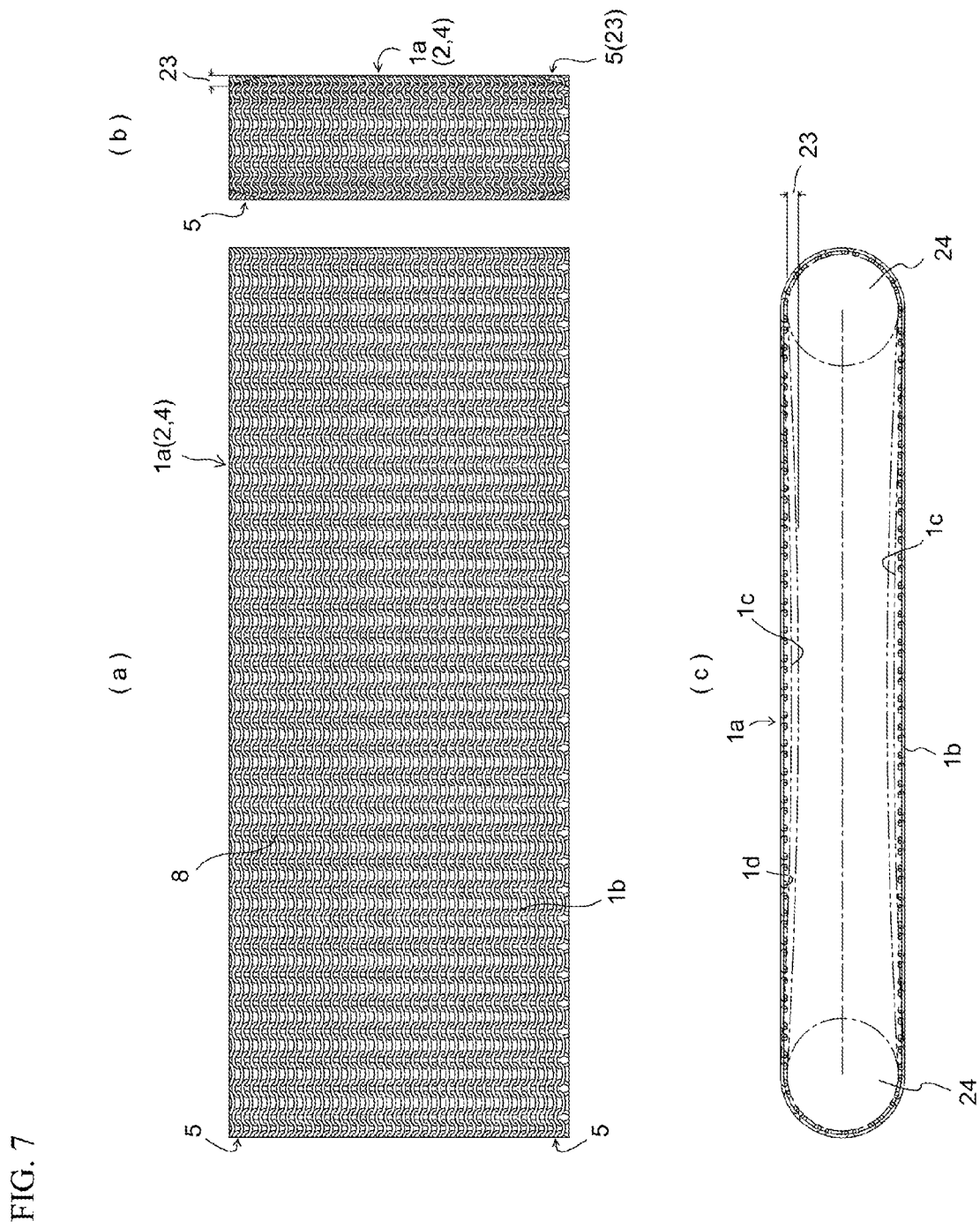
FIG. 7 Diagrams showing downwardly curled direction of side ends when projecting portions produced by entanglement are at the back surface of a knit belt in accordance with the present invention, (a) being a plan view, (b) being a side view, and (c) being a schematic sectional view of (a).
Figure 8:
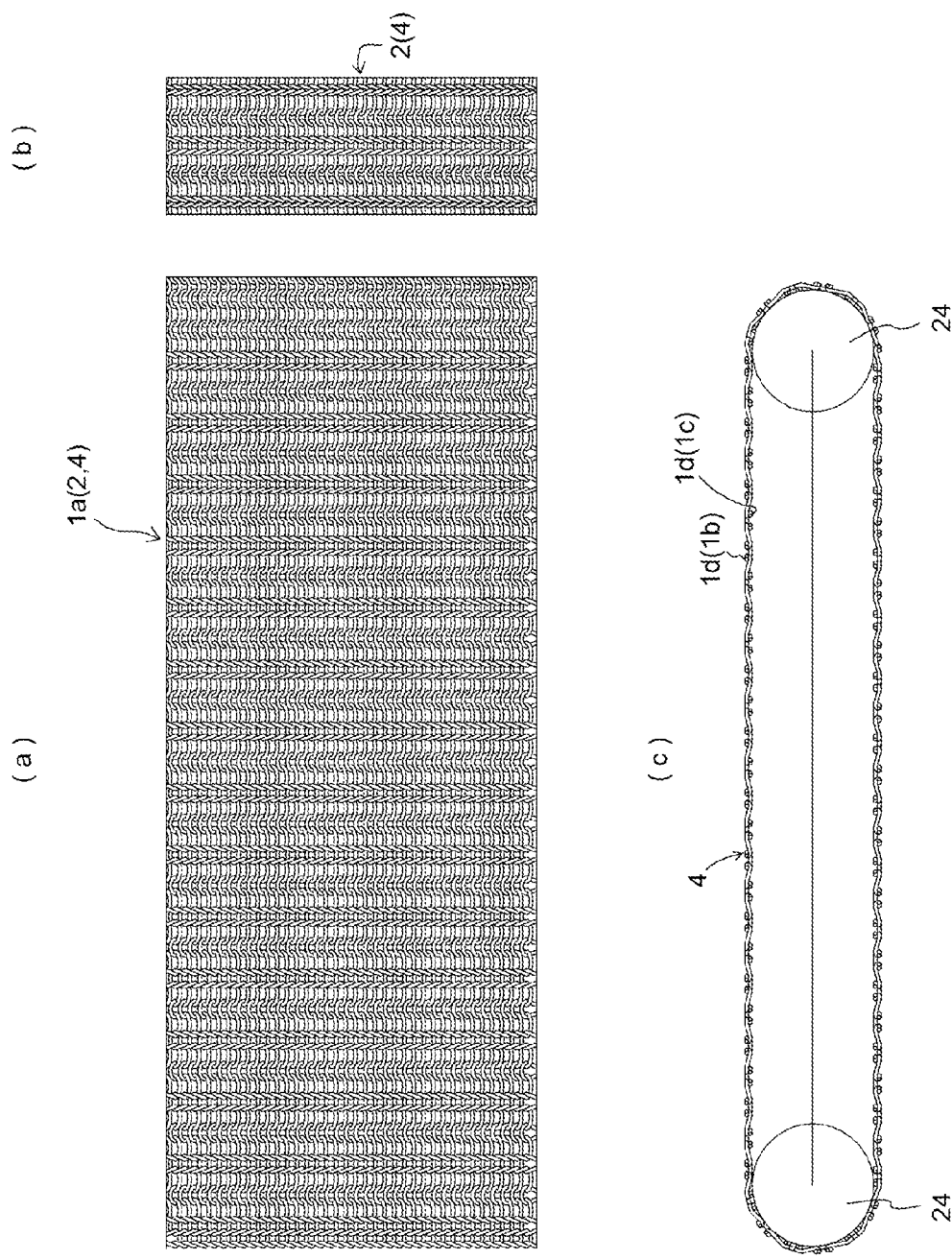
FIG. 8 A knit belt in which projecting portions produced by entanglement are at the front surface and the back surface of the knit belt in a knit belt in accordance with the present invention, (a) being a plan view, (b) being a side view, and (c) being a schematic sectional view of (a).
Figure 10:
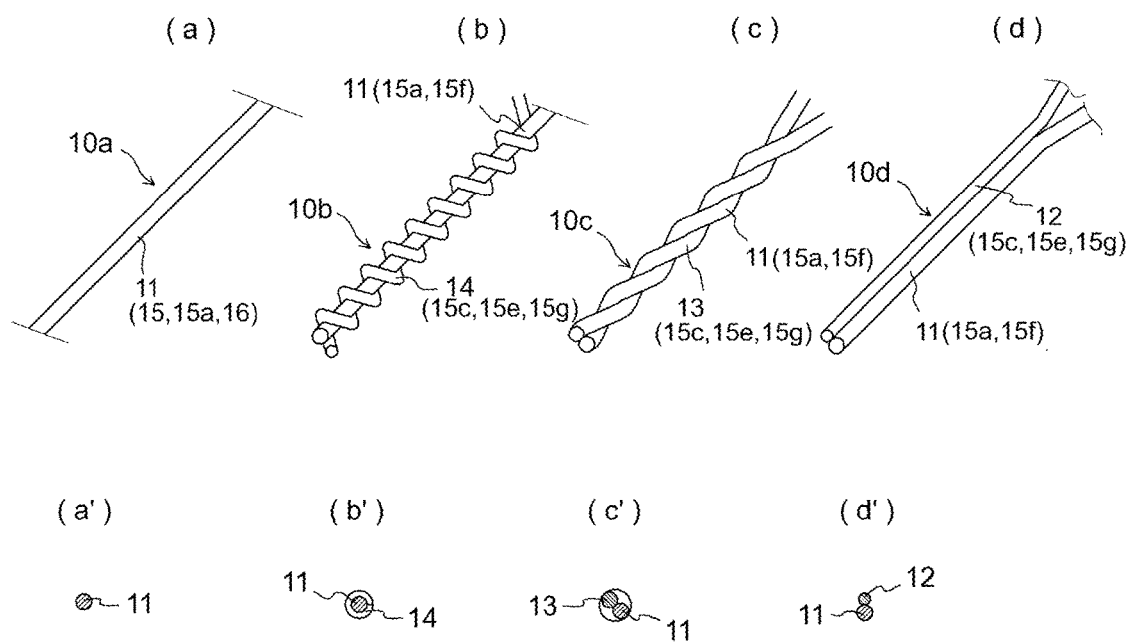
FIG. 10 Knitting yarn used in knit fabric for knit belts in accordance with the present invention, (a) being single-ply yarn, and (a') being a sectional view thereof (b) is knitting yarn which is covered yarn, being knitting yarn which is covered yarn in which a core yarn is covered with yarn having filament of material different from the core yarn, and (b') is a sectional view thereof (c) is knitting yarn which is twisted yarn, being knitting yarn which is twisted yarn in which there is a core yarn, and twisted thereabout there is yarn having filament of material different from the core yarn. (d) is knitting yarn which is plated yarn, being knitting yarn which is plated yarn in which a core yarn is plated with plating yarn having filament of material different from the core yarn, and (d') is a sectional view thereof.
Figure 11:
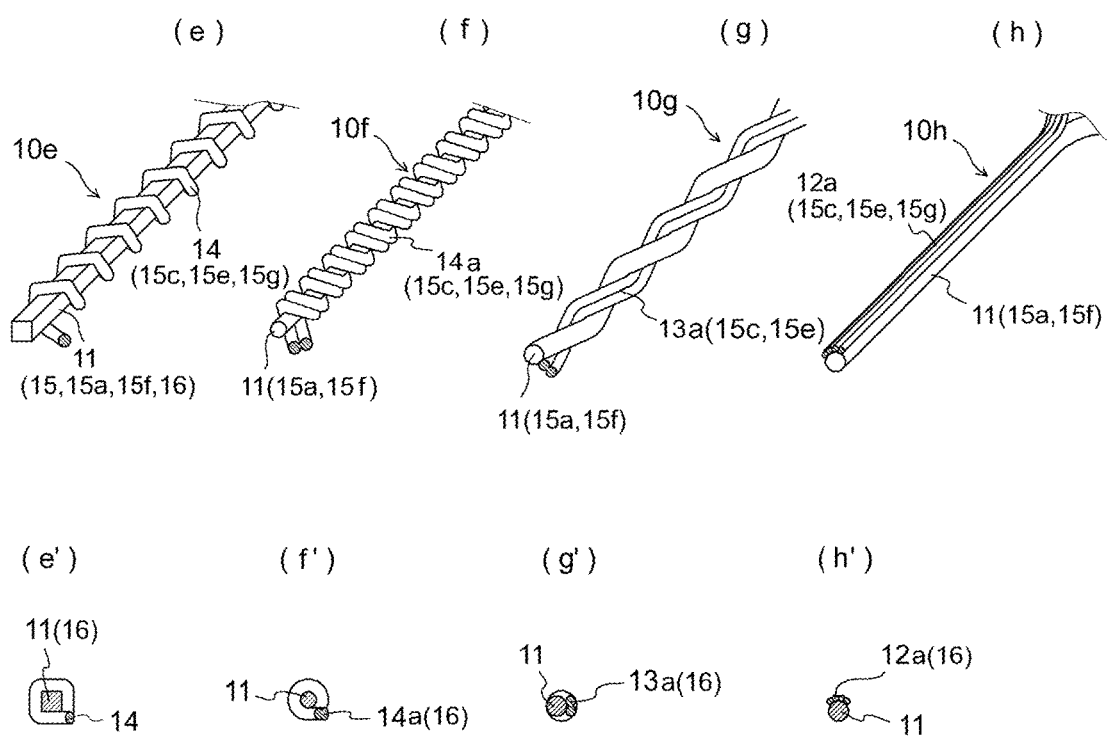
FIG. 11 Knitting yarn used in knit fabric for knit belts in accordance with the present invention, in which yarn of filament used in the knitting yarn is of modified cross-sectional shape, (e) being knitting yarn which is covered yarn in which the core yarn is of modified cross-section, and being knitting yarn in which the yarn used for covering has filament of material different from the core yarn, and (e') being a sectional view thereof (f) is knitting yarn which is covered yarn, being knitting yarn in which a core yarn is covered with yarn of modified cross-section and having filament of material different from the core yarn, and (f) is a sectional view thereof (g) is knitting yarn which is twisted yarn, being knitting yarn which is twisted yarn in which there is a core yarn, and twisted thereabout there is yarn of modified cross-section and having filament of material different from the core yarn, and (g') is a sectional view thereof (h) is knitting yarn which is used for plating, in which a core yarn is plated with plating yarn of modified cross-section and having filament of material different from the core yarn, and (h') is a sectional view thereof.

Furthermore, as shown in FIG. 6, FIG. 7, and FIG. 8, conveyor belt 2, which is a seamless knit belt 4 comprising knit fabric 7, is such that, as shown in FIG. 10 and FIG. 11, knitting yarn 10 used at knit belt 1a employs monofilament 15a comprising continuous fibers at filament 15 constituting core yarn 11, being formed from knit belt 1a which is knit fabric 7 that is weft-knit 7a such that filaments 15 are mutually intertwined. This knit fabric 7 is such that at least monofilament 15a of core yarn 11 is through flexural stress and heat made to undergo plastic deformation at locations where entangling occurs at entangled region 1e, and heat-setting is moreover carried out under conditions in which knit fabric 7 is held under tension following knitting, stabilizing the state by which knitting yarn 10 has been made to undergo plastic deformation and the state by which slack of large loops 9a has been made small, to form seamless knit belt 4 comprising knit pattern 8 which is weft-knit 7a. At knit pattern 8 in which pitch Ps of stitch loops in the stitch direction, i.e., width direction 18, is smaller than pitch Pg of stitch loops in the conveying direction 17, i.e., gauge direction, which is the drive direction, of this seamless knit belt 4, deformation of these mutually contacting loops 9 and filaments 15 causes the state of entanglement at entangled regions 1e of these filaments 15 to be maintained, the constitution being such as to prevent fraying at side ends 5 of knit belt 1a during conveying or driving by conveyor belt 2, and moreover being such as to reduce the pitch Ps of stitch loops in the stitch direction, i.e., width direction 18, and to cause loops 9 to approach and/or contact knitting yarn 10, such that it is a seamless conveyor belt 2 comprising knit belt 1a wherein strength has been improved in the conveying direction 17, i.e., drive direction.

Describing an embodiment of a second means in accordance with the present invention, it is a conveyor belt 2 which is a seamless knit belt 4 comprising knit fabric 7 in accordance with the first means, wherein, as shown in FIG. 18, conveyor belt 2 comprising knit fabric 7 which is weft-knit 7a has gaps that are produced by loops 9 in knit fabric 7; and the knitting yarn 10 employed in knit fabric 7 is knitting yarn 10 comprising monofilament 15a, flexural stress and heat causing this monofilament 15a knitting yarn 10 to undergo plastic deformation at stitch loop 9 locations where the monofilament 15a of this knitting yarn 10 mutually intersects and become entangled, or knitting yarn 10 employed at knit fabric 7 is knitting yarn 10 comprising a plurality of filaments 15, flexural stress and a prescribed amount of heat causing the knitting yarn 10, which is such that filament 15 exhibiting plastic deformation as a result of exposure to a prescribed amount of heat is included among the plurality of filaments, to undergo plastic deformation at stitch loop 9 locations where the plurality of filaments 15 of this knitting yarn 10 mutually intersect and become entangled, such that the entangled state of entangled region 1e is maintained, and such that the knit belt 1a which has been knit is such that the amount of looping, i.e., slack, of loop 9 has been stabilized by heat-setting.

Figure 3:
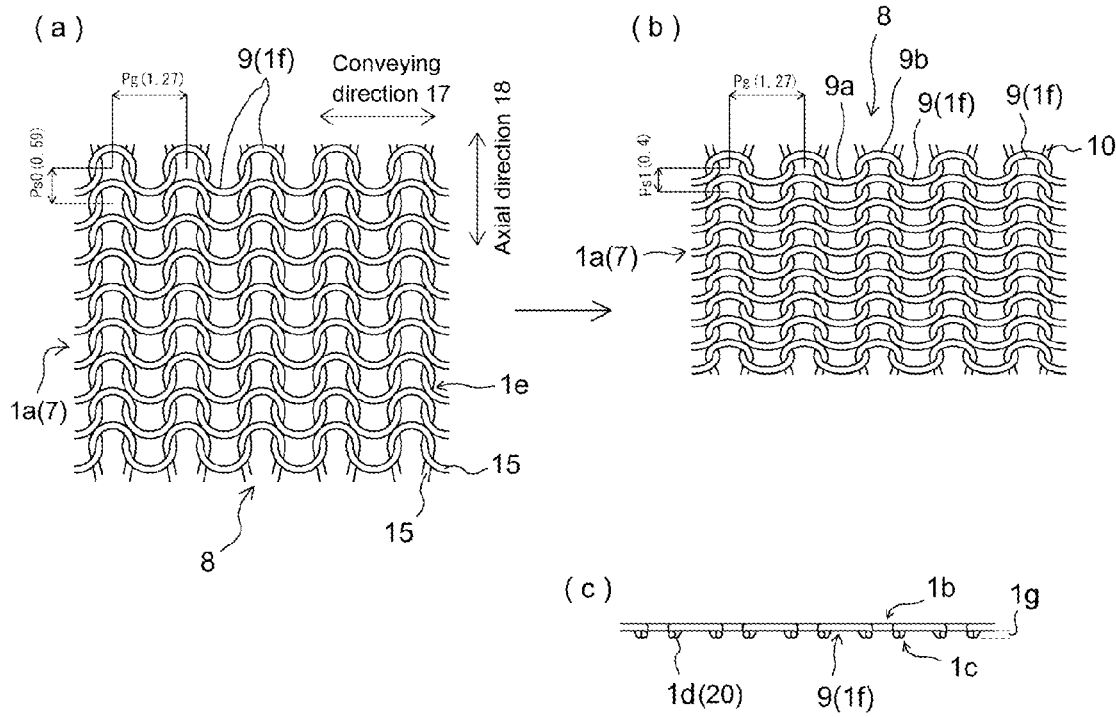
FIG. 3 Basic diagrams in which projecting regions produced by entanglement of knitting yarn are formed at a back surface of a conveyor belt having stitches comprising plain knit which is weft-knit, (a) being a plan view of knit fabric for conditions under which deformation of loops does not occur, (b) being a plan view of knit fabric for conditions under which deformation of loops does occur, and (c) being a sectional view of (b) as seen from below and in which projecting regions produced by entanglement are formed at the bottom.

Describing an embodiment of a third means in accordance with the present invention, knit belt 1a is a knit belt 1a which has been knit from a plurality of materials, being a knit fabric 7 formed such that continuous-fiber monofilament 15a employed in knitting yarn 10 comprising filament 15 constituting core yarn 11 shown at (a) in FIG. 10 is mutually intertwined as shown in FIG. 3, flexural stress and/or heat causing monofilament 15a of core yarn 11 to undergo plastic deformation at locations of entangled regions 1e, the knit pattern 8 thereof being such that pitch Ps of loops 9 in the width direction 18, i.e., stitch direction, which is the axial direction, is smaller than pitch Pg of loops 9 in the gauge direction, which is the conveying direction 17, of this knit belt 1a. Mutually contacting loops 9 and filament 15 in knit pattern 8 shown in this FIG. 3 are deformed, and entanglement of entangled regions 1e at filament 15 is maintained, causing improvement in the strength of conveyor belt 2 in the conveying direction 17 as a result of reduction in the pitch Ps of stitch loops in the width direction 18, i.e., stitch direction, which is the axial direction, and prevention of fraying at side ends 5 of knit belt 1a during conveying by conveyor belt 2. In addition, the knit belt 1a comprising a plurality of materials is, as shown in FIG. 10, a seamless knit belt 4 comprising knit fabric 7 which is formed by knitting in accordance with any one knitting method among three knitting methods, these being plating using a core yarn 11 and a yarn which comprises filament 15 of material different from this core yarn 11 and with which core yarn 11 is plated; knitting using knitting yarn 10c that is twisted yarn in which there is a core yarn 11 and a filament yarn which comprises filament 15 of material different from this core yarn 11 and which is twisted thereabout; and knitting using knitting yarn 10b that is covered yarn in which a core yarn 11 is covered by a yarn which comprises filament 15 different from core yarn 11. It is a seamless conveyor belt 2 which comprises a knit belt 1a in accordance with the second means that comprises a knit belt 1a in which the front surface 1b and the back surface 1c of this seamless knit belt 4 have different coefficients of friction or in which the front surface 1b and the back surface 1c of this seamless knit belt 4 have the same coefficient of friction.

Describing an embodiment of a fourth means, it is a seamless knit belt 4 comprising a knit pattern 8 that is weft-knit 7a, in which the knit belt 1a of the third means, which has been made to prevent fraying of filament 15 at side ends 5 of knit belt 1a, is such that knitting yarn 10 which is monofilament 15a comprising artificial continuous fiber is employed at core yarn 11, and is such that entangled regions 1e at which there is mutual intertwining of filament 15 are present. Monofilament 15a which forms this core yarn 11 is artificial fiber, core yarn 11 being knitting yarn 10 comprising high-resistance (highly insulating) monofilament 15a and/or electrically conductive filament 15f comprising artificial fiber. It is a knit belt 1a knit using knitting yarn 10 such that the knitting yarn 10 which includes this core yarn 11 at least comprises filaments 15 of different materials of not less than two types. Moreover, there is improvement of strength in the gauge direction, i.e., conveying direction 17, due to reduction in the pitch Ps of stitch loops in width direction 18, i.e., stitch direction, which is the axial direction. In addition, it is a seamless knit belt 4 employing knitting chosen from among plating using a plating yarn which comprises filament 15 of material different from core yarn 11, the filament 15c being of higher coefficient of friction than the coefficient of friction of core yarn 11; knitting using knitting yarn 10c that is twisted yarn in which there is a core yarn 11 and twisted thereabout there is filament 15 of material different from core yarn 11, the filament 15c being of higher coefficient of friction than the coefficient of friction of core yarn 11; and knitting using knitting yarn 10b that is covered yarn in which there is a core yarn 11 and serving as covering thereover there is filament 15 of material different from core yarn 11, the filament 15c being of higher coefficient of friction than the coefficient of friction of core yarn 11. In addition, it is a seamless conveyor belt 2 which comprises a knit belt 1a in accordance with the third means that comprises a knit belt 1a in which the front surface 1b and the back surface 1c of this knit belt 1a have different coefficients of friction or in which the front surface 1b and the back surface 1c of the knit belt 1a have the same coefficient of friction.

Describing an embodiment of a fifth means, knitting yarn 10 making up knit belt 1a employs core yarn 11 and filament 15 comprising flexible elastic fiber 15g of higher coefficient of friction than the coefficient of friction of core yarn 11, permitting improvement in the coefficient of friction of knit belt 1a. It is a seamless conveyor belt 2 comprising a knit belt 1a in accordance with the fourth means, in which, of the force of friction (gripping force) between a conveyor belt 2 comprising this knit belt 1a and a conveyed object which is placed on or sandwiched by a conveyor belt 2 comprising this knit belt 1a, and the force of friction (gripping force) between a conveyor belt 2 comprising the knit belt 1a and a drive roller 24 that drives a conveyor belt 2 comprising this knit belt 1a, at least one of these forces of friction (gripping forces) has been increased.

Describing an embodiment of a sixth means, it is a seamless conveyor belt 2 comprising a knit belt 1a in accordance with the fifth means, in which the force of friction (gripping force) between this conveyor belt 2 comprising knit belt 1a and a conveyed object which is placed on or sandwiched by conveyor belt 2 comprising the knit belt 1a is such that at least one of monofilament 15a making up core yarn 11 and filament 15 comprising elastic fiber 15g constituting knitting yarn 10 is shaped so as to have a modified cross-section 16 as shown at examples (e'), (f), (g'), and (h') in FIG. 11, the shape of this modified cross-section 16 being a modified cross-section 16 shaped so as to increase contact area with respect to at least one of a conveyed object which is placed on or sandwiched by conveyor belt 2 comprising the knit belt 1a and a drive roller 24 that drives conveyor belt 2.

Describing an embodiment of a seventh means, it is a seamless conveyor belt 2 comprising a knit belt 1a in accordance with any one of the fourth through the sixth means, in which, as shown at (e), (f), (g), and (h) in FIG. 11, present at knitting yarn 10 there is yarn which is filament of modified cross-section after the fashion of knitting yarn 10e which is covered yarn in which the core yarn is of modified cross-section, knitting yarn 10f in which the yarn serving as covering is of modified cross-section, knitting yarn 10g in which the yarn twisted thereabout includes yarn of modified cross-section, and knitting yarn 10h in which the plating yarn used for plating is of modified cross-section; at least one of monofilament 15a constituting core yarn 11 and filament at elastic fiber 15g is shaped so as to be of modified cross-section; knitting yarn 10 includes elastic fiber different from core yarn 11, the filament 15e being elastic fiber of low melting point lower than the melting point of core yarn 11; flexural stress or heat applied when this knitting yarn 10 is used during knitting of knit belt 1a causing deformation of knitting yarn 10; and heat-setting which is moreover carried out under conditions in which this is held under tension following knitting causing stabilization of stitches and causing filament 15e comprising elastic fiber of low melting point different from core yarn 11 to fuse to core yarn 11, stabilizing the intersecting and entangled state of entangled region 1e at knitting yarn 10, achieving both improvement in coefficient of friction of knit belt 1a as well as prevention of fraying of filament 15 in knitting yarn 10 at side ends 5 of knit belt 1a, and increasing the regions at which contact with the conveyed object occurs as well as improving conveying force.

Describing an embodiment of an eighth means, it is a knit belt 1a which comprises knitting yarn 10 provided with covering yarn 14a of modified cross-section or covering yarn 14 shown at (b) in FIG. 10 or at (e) or (f) in FIG. 11, or with plating yarn 12a of modified cross-section or plating yarn 12 shown at (d) in FIG. 10 or at (h) in FIG. 11, comprising a dielectric body and/or an insulating body over core yarn 11 so as to prevent direct contact with core yarn 11 comprising electrically conductive filament 15f; and in which it is electrically conductive monofilament 15f comprising artificial fiber constituting core yarn 11 and filament at elastic fiber 15g which is knitting yarn 10; flexural stress and/or heat causing this monofilament 15f to undergo plastic deformation at locations of entangled regions 1e; seamless knit belt 4, which is knit with a knit pattern 8 that is warp-knit 7b or weft-knit, having a knit pattern 8 in which pitch Ps of loops 9 in the width direction 18, i.e., stitch direction, which serves as the axial direction, is smaller than pitch Pg of loops 9 in the gauge direction, which serves as the conveying direction 17; this knit pattern 8 being such that there is deformation of loops 9 which are mutually adjacent with respect to each other and of filament at yarn, and entangled regions 1e at which filament is entangled are maintained, as a result of which fraying at side ends 5 of knit belt 1a during conveying of conveyor belt 2 is prevented, and the pitch Ps of loops 9 in the stitch direction, which is the conveying direction 17, is moreover reduced, reduction in this pitch Ps causing increase in strength in the conveying direction 17. It is a seamless conveyor belt 2 comprising a knit belt 1a in accordance with the seventh means in which, at the knit belts 1a that are these conveyor belts 2, a desired gap is formed due to the thickness of the covering yarn (which is to say it is the diameter of the covering yarn) or the thickness of the plating yarn (which is to say it is the diameter of the plating yarn) at core yarn 11 comprising electrically conductive filament 15f and the conveyed object by the yarn with which core yarn 11 is covered or the yarn with which core yarn 11 is plated; and, at a conveyor apparatus 25 at which this knit belt 1a is used, core yarn 11 comprising electrically conductive filament 15f from which knit belt 1a is constituted is made to be in one state chosen from among a state in which it is floating, a state in which it is grounded to earth, and a state in which a voltage is applied thereto.

Describing an embodiment of a ninth means, at knit belt 1a constituting conveyor belt 2, yarn 12 for plating, or yarn 12a of modified cross-section for plating, core yarn 11, or yarn 14 for covering, or yarn 14a of modified cross-section for covering, core yarn 11 constitutes filament which is low-melting-point elastic fiber 15e of coefficient of friction higher than that of core yarn 11, and has a melting point which is lower than the melting point of core yarn 11; flexural stress and/or heat applied during knitting of knit belt 1a causing deformation of knitting yarn 10; heat-setting causing filament of this low-melting-point elastic fiber 15e to fuse to core yarn 11, stabilizing the state shown in FIG. 3 at which knitting yarn 10 intersects and is entangled at entangled region 1e; the constitution being such as to prevent fraying of knitting yarn 10 at side ends 5 of knit belt 1a, to improve the coefficient of friction of knit belt 1a, and to, by means of plating yarn 12, or plating yarn 12a of modified cross-section, or by means of covering yarn 14, or covering yarn 14a which is yarn of modified cross-section, prevent the conveyed object and electrically conductive filament 15f of core yarn 11 from coming in direct contact. In addition, as a result of causing core yarn 11 constituting electrically conductive filament 15f at knit belt 1a to be in one state chosen from among a state in which it is floating, a state in which it is grounded to earth, and a state in which a voltage is applied thereto, it is a knit belt 1a which permits a conveyed object to be electrostatically held thereto or which permits removal of charge from a conveyed object that has accumulated charge due to electrical action, this knit belt 1a being a seamless conveyor belt 2 comprising a knit belt 1a in accordance with the eighth means.

Describing an embodiment of a tenth means, in the context of a conveyor belt 2 comprising a knit belt according to any one means among the first means through the ninth means, prevention of upwardly curled region 22 at side ends 5 of knit belt 1a is carried out by using entangled region 1e of knitting yarn 10 comprising filament to form projecting region 1d at least at the back surface 1c of the knit belt, as shown at (c) in FIG. 7 or (c) in FIG. 8. This projecting region 1d made up of yarn entangled region 1e is formed as shown at (c) in FIG. 3. It is a seamless conveyor belt 2 comprising a knit belt 1a in accordance with the ninth means in which such a projecting region 1d comprising entangled region 1e of knitting yarn 10 is formed at location(s) arranged at least at the back surface 1c of knit belt 1a shown at (c) in FIG. 7, or the back surface 1c and/or front surface 1b of knit belt 1a shown at (c) in FIG. 8.

Figure 14:
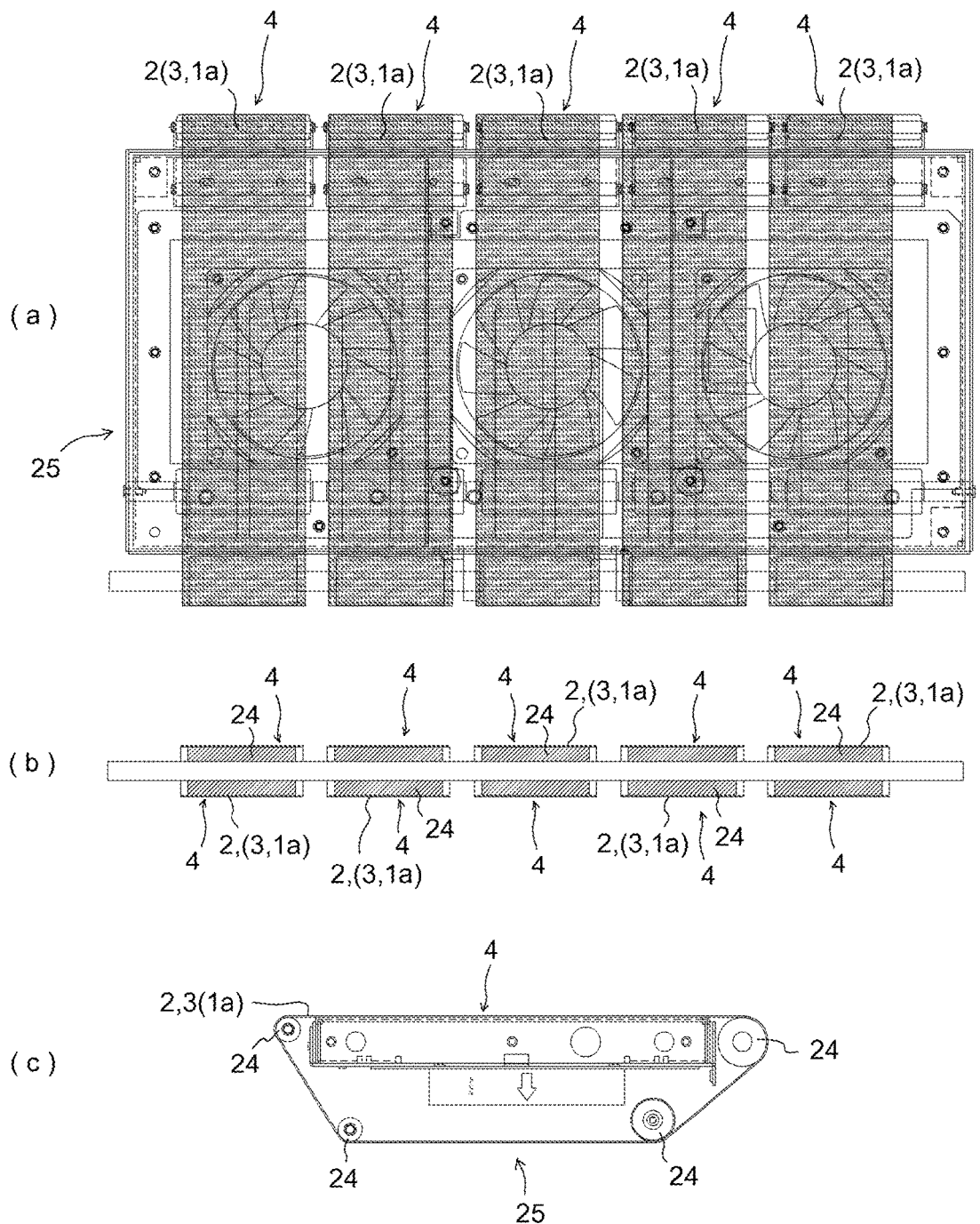
FIG. 14 Example of a conveyor apparatus that uses a knit belt comprising knit fabric in accordance with the present invention as a drive belt, (a) being a plan view, (b) being a side view, and (c) being an elevational sectional view showing drive belts and drive rollers.

Describing an embodiment of an eleventh means, this embodiment is shown in FIG. 14 and is a knit belt 1a which forms a drive belt 3 that transmits drive force. As shown in FIG. 3, it is the seamless knit belt 4 shown in FIG. 14, which is knit so as to be of gauge corresponding to prescribed pitch Pg and so as to have projecting region 1d in entangled region 1e at back surface 1c of knit belt 1a. The diameter of knitting yarn 10 causes formation of the height of projecting region 1*d* at back surface 1*c* of knit belt 1*a* at entangled region 1*e* shown in FIG. 3, the height of projecting region 1*d* at the back surface 1*c* of this knit belt 1*a* causing there to be a step 1*g* between it and non-entangled region 1*f*. Knit belt 1*a* is driven through use of step 1*g* which is present at the back surface 1*c* of this knit belt 1*a*. It is a seamless drive belt 3 comprising a knit belt 1*a* in accordance with the tenth means, being a drive belt 3 constituted such that, at drive roller 26 and/or drive pulley 26 shown at (b) in FIG. 15, grooves 26*a* which engage with projecting regions 1*d*, which are formed by entanglement of knitting yarn 10, shown at (c) in FIG. 3, are formed at drive roller 26 and/or drive pulley 26 and at idler roller 27 and/or idler pulley 27, at the back surface 1*c* of the drive belt 3 constituting seamless knit belt 4, engagement of projecting regions 1*d* at entangled regions 1*e* on the back surface 1*c* of drive belt 3, which constitutes this seamless knit belt 4, with grooves 26*a* formed at this drive roller 26 and/or this drive pulley 26, causing drive force to be drive force transmitted to the idler roller 27 and/or idler pulley 27.

Describing an embodiment of a twelfth means, it is a drive belt 3 comprising a seamless knit belt 4 which is a knit belt 1*a* comprising a knit belt 1*a*, in which, in the context of the foregoing eleventh means, knit belt 1*a* forming drive belt 3 constituted such that engagement of projecting regions 1*d* at entangled regions 1*e* of seamless knit belt 4 with grooves 26*a* formed at drive roller 26 and/or drive pulley 26 shown in FIG. 15 causes drive force to be transmitted is a knit belt 1*a* comprising knitting yarn 10 in which there are a plurality of materials, being a seamless knit belt 4 comprising knit fabric 7 chosen from among a knit employing covered knitting yarn 10*b* in which there is core yarn 11 that is covered by filament of material different from this core yarn 11, covered knitting yarn 10*e* in which the core yarn is of modified cross-section, or knitting yarn 10*f* in which the covering-yarn yarn is of modified cross-section, a knit employing twisted knitting yarn 10*c* in which there is core yarn 11 and filament twisted thereabout which is of material different from this core yarn 11, or knitting yarn 10*g* in which the yarn twisted thereabout includes yarn of modified cross-section, or plating employing plated knitting yarn 10*d* in which there is core yarn 11 and filament plated thereabout of material different from this core yarn 11, or plated knitting yarn 10*h* in which the plating yarn used for plating is of modified cross-section, the filament constituting core yarn 11 employing monofilament 15*a* made up of continuous fiber, being a seamless knit belt 4 in which the front surface 1*b* of knit belt 1*a* and the back surface 1*c* of knit belt 1*a* have different coefficients of friction or being a seamless knit belt 4 in which the front surface 1*b* of knit belt 1*a* and the back surface 1*c* of knit belt 1*a* have approximately the same coefficient of friction, and particularly to increase the force of friction of knit belt 1*a* with respect to an object conveyed thereby, to, for example, employ plated knitting yarn 10*d* in which the yarn with which core yarn 11 is plated is filament 15*e* of low-melting-point elastic fiber having a coefficient of friction that is higher than that of core yarn 11, plated knitting yarn 10*h* in which the yarn used for plating is of modified cross-section, twisted knitting yarn 10*c*, twisted knitting yarn 10*g* in which the yarn twisted thereabout includes yarn of modified cross-section, covered knitting yarn 10*b*, covered knitting yarn 10*e* in which the core yarn is of modified cross-section, or covered knitting yarn 10*f* in which the covering yarn is of modified cross-section, so as to have improved force of friction (gripping force).

Describing an embodiment of a thirteenth means, a seamless conveyor belt 2 comprising a knit belt 1*a* in accordance with any one of the first through the eleventh means has been applied for use in an apparatus having means for conveying an object. It is a conveyor apparatus 25 employing a seamless conveyor belt 2 comprising a knit belt 1*a* for utilizing, in an apparatus having conveyor means, elongation which is present when knit belt 1*a* is held under tension, to address the situation that exists when more elongation is required than that which is produced by slack in loops 9 in the stitches of the knit belt.

Note that knit pattern 8, which is weft-knit 7*a*, at the foregoing first means or fourth means may be selected from among jersey knit (plain knit), rib stitch (also referred to as ribbing), and/or purl stitch (also referred to as links-links stitch). Furthermore, variations on the foregoing knit patterns 8 may be used, it being possible to employ those in which direction and/or fiber density is controlled for regulation of stretching, and it also being possible to employ warp-knits 7*b* which are, for example, tricot-knit, milanese-knit, raschel-knit, or the like. As examples of knit fabrics 7 that are textiles which are weft-knit 7*a* and employ such knit pattern variations, knit fabrics 7 that are textiles which are weft-knit 7*a* such as cardigan stitch (rib stitch), circular interlock stitch, 1/1 tuck stitch, 2×2 rib stitch, and mesh stitch may be cited. Moreover, any of various operations such as knit, tuck, miss (welt), transfer, inlay (insertion), and so forth may be combined as appropriate with these textile knit fabrics 7 so as to permit the knit fabrics 7 that are formed which are textiles that are weft-knit 7*a* to be utilized for realization of any of a variety of pattern variations. Moreover, for manufacture of the seamless belt, it is possible to employ for manufacture thereof a circular knitting machine that is capable of forming knit textiles which are cylindrical.

Moreover, this conveyor belt 2 which is a belt 1 in accordance with the present invention is formed from knit fabric 7 which is weft-knit 7*a* and/or warp-knit 7*b*, and knitting yarn 10 that forms knit pattern 8 which is knit fabric 7 that is weft-knit 7*a* comprises filament which is artificial continuous fiber. This conveyor belt 2 comprises knit fabric 7 in which filaments of this knitting yarn 10 are intertwined with adjacent filaments. At this conveyor belt 2, dimensions of adjacent loops 9 in the gauge direction, which is the conveying direction 17, are such that there are loops of different size (see (b) at FIG. 2), being comprised of a knit pattern 8 in which pitch Ps of loops 9 in the width direction 18, i.e., stitch direction, which is the axial direction, is smaller than pitch Pg of loops 9 in the gauge direction, which is the conveying direction 17. In addition, mutually contacting stitch loops 9 possess stitch loops 9 which are large loops 9*a* and small loops 9*b*, filament at locations of entangled regions 1*e* of filament 15 being made to undergo plastic deformation; and stitch loops 9 which mutually contact in the conveying direction 17 possess stitch loops 9 which are large loops 9*a* and small loops 9*b*, filament at locations of entangled regions 1*e* of filament 15 being made to undergo plastic deformation, the amount of looping corresponding to slack of yarn at large loops 9*a* being made smaller than that at knit fabric not made to undergo plastic deformation, reducing elongation due to slack, being comprised of a state such that entangled region 1*e* is formed by mutual intertwining of filament (see (a) at FIG. 3). Moreover, from this state, elongation due to slack of large loops 9*a* is made small; and small loops 9*b*, which tend not to deform at low tension, are made to deform even when in a state in which there is little percent elongation of the belt; conveyor belt 2 being such that the force required to hold conveyor belt 2 under tension can be obtained even where percent elongation is low. The constitution is such that loops 9 are made to approach or contact knitting yarn 10 in the width direction, i.e., stitch direction, which is the axial direction 18, conveyor belt 2 being such as to permit reduction in the change in belt width due to tension. At the same time, density of small loops 9b in the width direction 18 is improved; strength of conveyor belt 2 in the conveying direction 17 direction is improved; fraying of knitting yarn 10, i.e., filament 15, at side ends 5 and breakage of yarn at knit belt 1a forming conveyor belt 2 during operation of conveyor belt 2 are prevented; strength and tension of conveyor belt 2 comprising knit fabric 7 are adequately improved; and change in width of conveyor belt 2 when it is held under tension is moreover made small.

Figure 1:
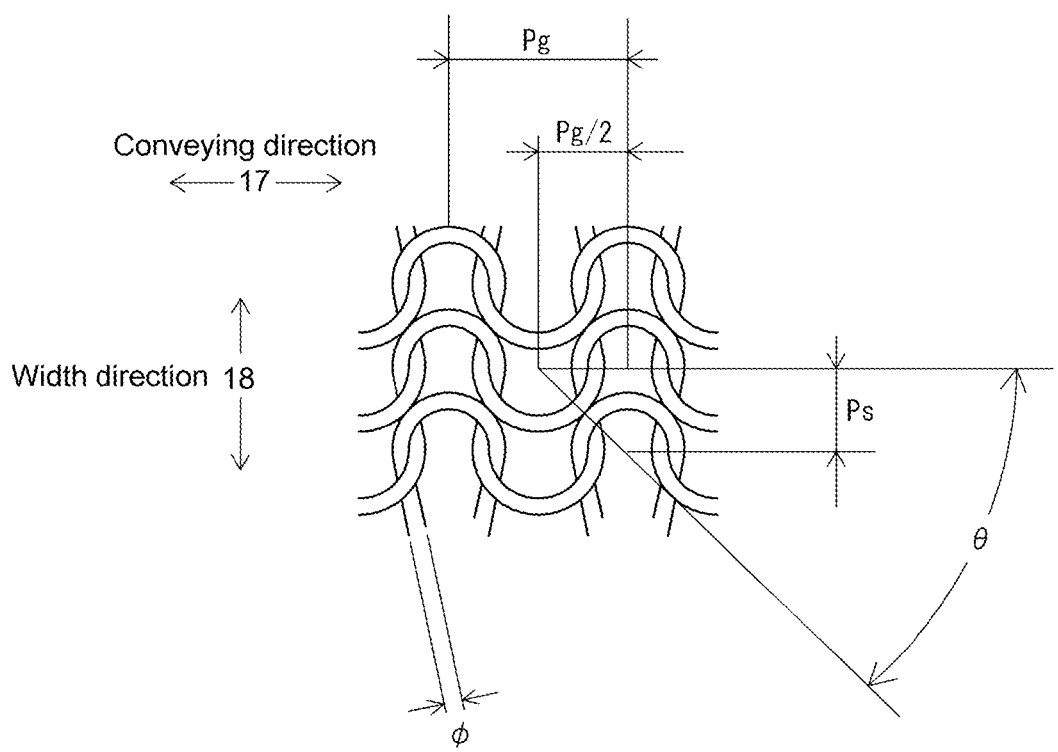
FIG. 1 Plan view showing stitches comprising plain knit which is weft-knit.

As shown in FIG. 1, the inventors have found that the relationship among, in the context of weft knits, pitch Pg of stitch loops 9 in the gauge direction, i.e., conveying direction 17; pitch Ps of stitch loops 9 in the stitch direction, i.e., width direction 18 perpendicular to conveying direction 17; and filament diameter φ, can be expressed as indicated at FORMULA (1), below.

$$Ps^2+(Pg/2)^2=(Pg/2+2\phi)^2 \quad (1)$$

which can be rewritten as $Ps^2=2\phi \cdot Pg+4\phi^2$ (1)

where:
Ps=Pitch in stitch direction, i.e., width direction 18,
Pg=Pitch in gauge direction, i.e., conveying direction 17,
φ=Filament diameter, and
θ=Angle for which pitch Ps of loops 9 in the stitch direction, i.e., width direction pitch 18, advances by 1 unit of pitch for every ½ unit of pitch advanced by pitch Pg of loops 9 in the gauge direction, i.e., conveying direction 17.

Moreover, note that Ps, above, is defined such that:
$Ps_0$ indicates that neighboring loops 9 are in mutual contact but deformation of loops 9 does not occur, and
$Ps_1$ indicates that neighboring loops 9 are in mutual contact and deformation of loops 9 does occur (assuming that: $Ps_0>Ps_1$.)

FIG. 18, being a weft-knit example, shows deformation of stitches in a knit belt in accordance with the present invention. FIG. 18 (a) shows a diagram of stitches which do not undergo plastic deformation, and FIG. 18 (b) shows a diagram of stitches in a knit belt which is a knit belt in accordance with the present invention and which is formed such that plastic deformation does occur. Comparing knit belt 1a which has been knit under conditions such that plastic deformation of loops 9 does occur as shown at (b) in FIG. 18, and knit belt 1a which has been knit under conditions such that plastic deformation of loops 9 does not occur as shown at (a) in FIG. 18, there is ordinarily slack in knitting yarn 10 due to loops 9 as shown at (a) in FIG. 18 or (a) in at FIG. 20, elongation in such a knit belt 1a being excessive, even at low tension, relative to what would be considered to be adequate. It therefore occupies a low-tension domain in which percent elongation would become large before slack of loops 9 of knitting yarn 10 could be minimized, and because use of a knit belt 1a occupying such a low-tension domain would cause the tension under which it is held to be low and cause the gripping force, i.e., force of friction, between it and drive roller 24 (see (c) at FIG. 14) to be too small, this would cause occurrence of slippage between such a knit belt 1a and drive roller 24.

And so, describing knit belt 1a in accordance with the present invention, knit belt 1a in accordance with the present invention shown at (b) in FIG. 18 is a knit belt 1a comprising knit fabric in which loops 9 are formed such that adjacent loops in the conveying direction 17 are of different dimensions; and in addition, flexural stress and/or heat applied to knitting yarn 10 during knitting causes plastic deformation of knitting yarn 10; and moreover, following knitting, stress (tension) which is applied from the inside surface of the cylindrical knit fabric fabricated by the knitting machine causes formation of a state in which slack at large loops 9a is decreased, heat-setting causing stabilization such that the amount of looping at slack in large loops 9a has been made small, stabilizing the stitches of the knit fabric. Describing this point in further detail, in terms of unit lengths, reduction in pitch Ps of stitch loops in the width direction 18, i.e., stitch direction, which is the axial direction, causes increase in density of stitch loops 9 in the stitch direction, i.e., width direction 18, and improves strength in the conveying direction 17. Moreover, as a result of reduction of pitch Ps of stitch loops in the stitch direction i.e., width direction 18, large loops 9a are made to undergo deformation, reducing length at locations of entanglement at entangled regions 1e, increasing the tendency for plastic deformation of filament 15 to occur, preventing fraying at projecting portions 20 and reducing elongation due to excessive slack as shown at (b) in FIG. 18 and as shown at (c) in FIG. 2, and reducing the rise time associated with a subsequent application of tension. That is, as shown at (b) in FIG. 18, in accompaniment to deformation of large loops 9a, curvature (1/radius) of loops 9 is reduced, reducing slack of large loops 9a in the stitches, as a result of which elongation due to excessive slack is reduced, such that after elongation which occurs due to slack at large loops 9a, elongation thereafter occurs only as a result of deformation or the like of small loops 9b which tend not to deform at low tension, as a result of which high tension associated with elongation in accompaniment to deformation of small loops 9b is obtained, making it possible to obtain the required tension at belt 1. Furthermore, as a result of such constitution, it is a knit belt 1a in which the angle of tension as a function of percent elongation at conveyor belt 1 can be adjusted as appropriate based on the diameter of the filament used at knitting yarn 10, the filament material, the density of small loops 9b in the stitch direction, and the density of loops 9 in the gauge direction.

Figure 2:
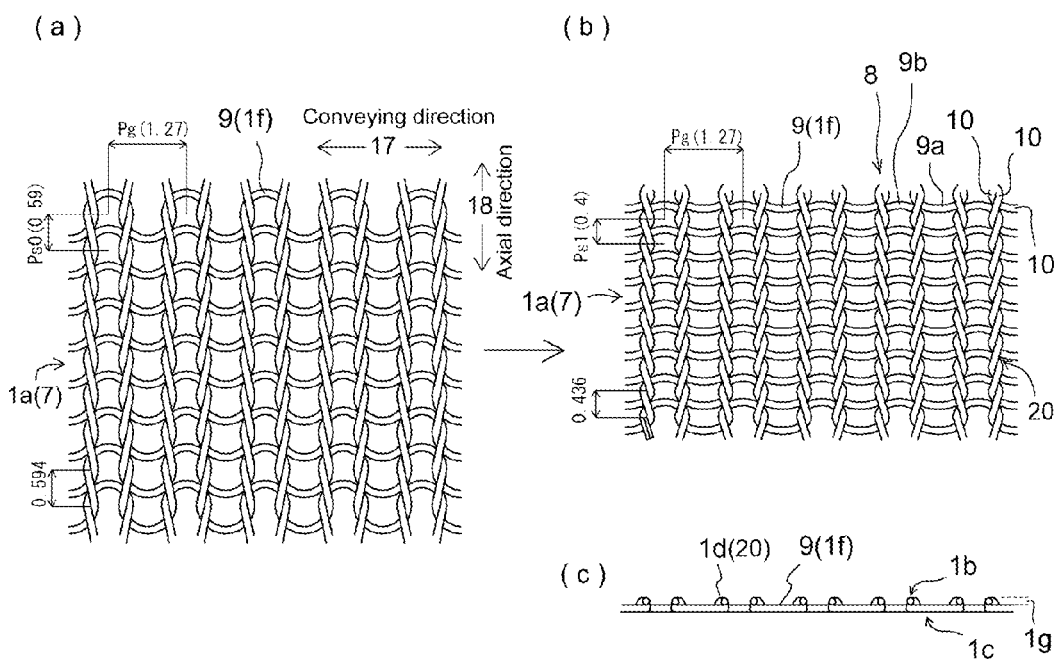
FIG. 2 Basic diagrams in which projecting regions at entanglement of knitting yarn are formed at a front surface of a conveyor belt having stitches comprising plain knit which is weft-knit, (a) being a plan view of knit fabric for conditions under which deformation of loops does not occur, (b) being a plan view of knit fabric for conditions under which deformation of loops in the stitch direction does occur, and (c) being a diagram which is a side view of (b) and in which projecting regions produced by entanglement are formed at the top.

FIG. 2 shows an example of a situation in which projecting portions 20 produced at locations of entanglement of loops 9 provided on the conveying surface at the front surface 1b of knit belt 1a. In addition, (a) at FIG. 2 shows stitches which do not undergo plastic deformation, and (b) at FIG. 2 shows stitches when knitting yarn 10 is made to undergo plastic deformation. At FIG. 2, the fact that projecting portions produced by entanglement of loops 9 are at the front surface increases the tendency for the side ends 5 of knit belt 1a to curl upward; and in particular, where the diameter of the filament which is the core yarn 11 is small, this will cause increased tendency of occurrence of the curl that is so characteristic of knit fabrics, and increase the tendency for the side ends 5 of the belt 1 to curl upward. For this reason, where core yarn 11 in a knit belt 1a in which projecting portions 20 produced by entanglement of filament 10 are provided at the front surface is monofilament 15a comprising artificial fiber, it is preferred that a filament diameter of thickness not less than 0.1 mm be employed as the filament diameter, and more preferred is that it is more preferred that this be not less than about 0.15 mm. In contradistinction to FIG. 2, FIG. 3 is an example of a situation in which projecting portions 20 produced by entanglement of loops 9 are at the back surface 1c of knit belt 1a, in which case there is a tendency for the side ends 5 of the knit belt 1a to curl downward. Depending on the manner in which knit belt 1a having stitches as shown in this FIG. 2 and this FIG. 3 will be used, appropriate choice should be made so as to cause projecting portions 20 produced by entanglement of loops 9 to be at the front surface or back surface.

Figure 4:
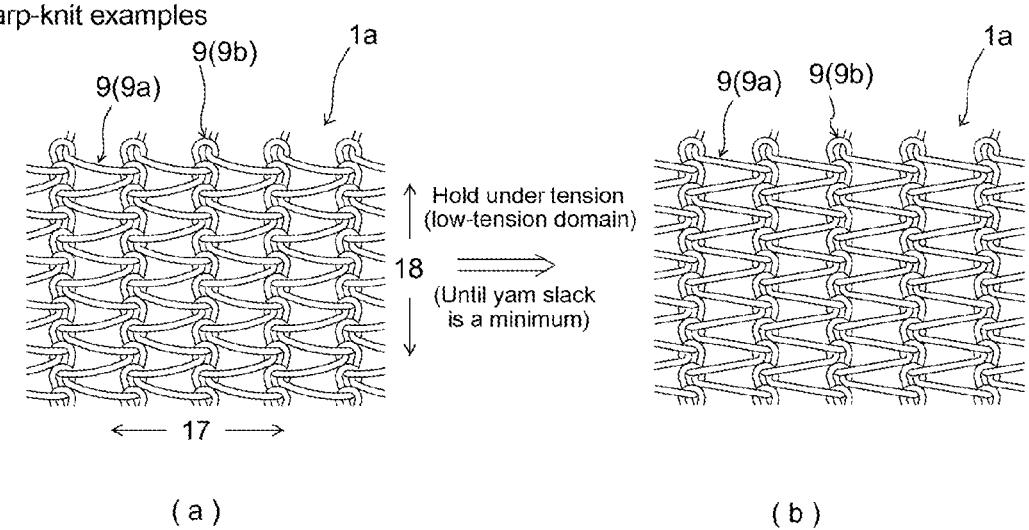
FIG. 4 Basic diagrams of a conveyor belt having stitches comprising warp-knit in accordance with the present invention, (a) being a plan view of knit fabric in which filament has undergone plastic deformation before being held under tension, and (b) being a plan view of knit fabric for conditions under which slack in large loops is at a minimum as a result of being held under tension.

FIG. 4 is an example of a knit belt 1a comprising knit fabric 7 made from warp-knit 7b which comprises single-tricot-knit. FIG. 4 (a) is a constitution in which, following knitting, stress (tension) is applied to the inside surface of the belt, and heat-setting causes occurrence of plastic deformation, as a result of which the amount of looping at slack in large loops 9a is made small. FIG. 4 (b) shows a state in which yarn is held under tension until slack therein is minimized, a state being shown in which large loops 9a are in particular fully stretched.

Figure 5:
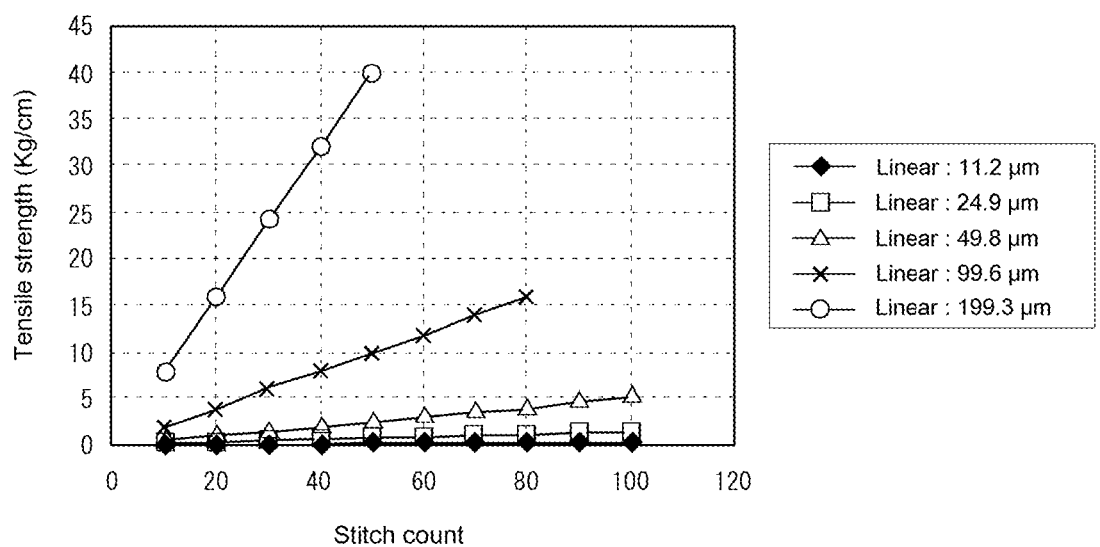
FIG. 5 Graph showing relationship between stitch count and tensile strength for various filament diameters $\phi$ in weft-knit.

FIG. 5 is a graph showing theoretical calculation of the relationship between stitch count and tensile strength for several different diameters of filament 15 which is polyamide fiber ("Nylon" (trademark)) which is continuous fiber. Based on the graph in this FIG. 5, it is clear that, from the standpoint of tensile strength, filament diameter for continuous fiber should be not less than 50 μm to be of usable diameter, and it is more preferred that this be not less than 100 μm.

FIG. 6 shows a seamless knit belt 4 in accordance with the present invention, being a conveyor belt 2 in which projecting regions 1d produced at entangled regions 1e of the stitches are, as shown at (c) in FIG. 6, made to be on the front-surface side of knit belt 1a. (a) in this FIG. 6 is a plan view of conveyor belt 2; (b) in FIG. 6 is an elevational view as seen from the right side in the drawing at (a) in FIG. 6 and shows how the side ends of knit belt 1a are curled upward; and (c) in FIG. 6 is a side view of conveyor belt 2. Conveyor belt 2 shown in this FIG. 6 being such that projecting regions 1d produced by entangled regions 1e at the stitches are uniformly present on the front surface 1b of knit belt 1a, excessive tension and excessive rise in temperature within conveyor apparatus 25 will, as can be seen at (b) in FIG. 6, tend to cause occurrence of regions 22 which are curled upward in the direction of the front-surface side at the side ends 5 of knit belt 1a, the amount of upward curling at upwardly curled regions 22 at projecting regions 1d, i.e., projecting portions 20, which are curled upward in the direction of the front-surface side, at side ends 5 of knit belt 1a being shown as having the width indicated by the broken line at (c) in FIG. 6. It is thus desirable in the context of belts in which projecting portions 20 are formed at the front surface thereof that these be used at low to medium tension and in apparatuses that do not often undergo excessive changes in temperature. Furthermore, it is preferred where tension is required that the knit belt 1a which is used be such that diameter of the monofilament at core yarn 11 constituting knitting yarn is large.

Furthermore, FIG. 7 and FIG. 8 show seamless knit belts 4 in accordance with the present invention. First, seamless knit belt 4 shown at (c) in FIG. 7 is such that projecting regions 1d produced by entangled regions 1e at loops 9 are arranged so as to be on the back surface 1c of knit belt 1a. In addition, as can be seen at (b) and (c) in FIG. 7, the side ends 5 of knit belt 1a are such that formed therein are downwardly curled regions 23 constructed so as to curl downward toward the side which is in the direction of the back surface 1c of the knit belt 1a. In addition, as can be seen at (b) in FIG. 7, the amount of downward curling of regions 23 that curl downward toward the side which is in the direction of the back surface 1c at the side ends 5 of the knit belt 1a are shown as having the width indicated by the broken line at (c) in FIG. 7. Thus, unlike the seamless knit belt 4 of FIG. 6, the seamless knit belt 4 in this FIG. 7 is constructed such that projecting regions 1d produced at entangled regions 1e of the stitches are arranged on the back surface 1c of knit belt 1a, downward curling toward the side which is in the direction of the back surface 1c at the side ends 5 of the knit belt 1a causing the conveying surface at the front surface 1b of knit belt 1a to be flat. Accordingly, it is not affected by upward curling at side ends 5 after the fashion of FIG. 6, the seamless knit belt 4 in accordance with the present invention at FIG. 7 is capable of producing a conveyed state which is such that conveyance of lightweight sheet-like conveyed objects that are wider than the width of conveyor belt 2 is made stable. Because it is thus capable of carrying out conveyance in stable fashion, there is no need to, together with conveyance of conveyor belt 2 which is knit belt 1a, employ action in which suction is applied from the side which is the back surface 1c of knit belt 1a so that sheet-like conveyed objects will be secured to the knit belt 1a side.

Moreover, at seamless knit belt 4 shown in FIG. 8, projecting regions 1d produced at entangled regions 1e of loops 9 are arranged so as to be provided uniformly and in alternating fashion with each stitch on the side which is the front surface 1b of, and on the side which is the back surface 1c of, knit belt 1a. Accordingly, regions 22 that curl upward toward the side which is in the direction of the front surface at the side ends 5 of knit belt 1a in FIG. 6, and regions 23 that curl downward toward the side which is in the direction of the back surface at the side ends 5 of the knit belt 1a in FIG. 7, do not occur but rather mutually cancel one another in this FIG. 8; and moreover, because projecting regions 1d formed by entangled regions 1e of loops 9 protrude uniformly and in alternating fashion with each stitch, the mutually protruding effects mutually cancel one another, so that projecting regions 1d do not protrude from either the front surface 1b or the back surface 1c of knit belt 1a, and the entirety is formed so as to be in a plane which is more or less flat. Note that one way of knitting such a knit belt 1a would be through use of the circular rib stitch.

By causing projecting regions 1d of entangled regions 1e at loops 9 to be arranged on the side that is the back surface 1c of knit belt 1a as shown in the foregoing FIG. 7 and FIG. 8, it is possible to prevent, or adjust the relative amount of, upward curling of side ends 5 of knit belt 1a, making it possible to stably convey even conveyed objects which are sheet-like and of low load. Of course, the fractional amount of projecting regions 1d that are arranged on the side that is the back surface 1c of knit belt 1a should be set as appropriate in correspondence to the load per unit area of the conveyed object that is to be conveyed. Furthermore, in apparatuses in which there is rise in temperature within the conveyor apparatus 25, it is easier to stabilize downward curling than upward curling when carrying out conveyance of a conveyed object such as standardly sized paper or the like. It is therefore preferred in a conveyor apparatus 25 for such standardly sized paper or the like that the fractional amount of projecting regions 1d that are on the back surface 1c be not less than 50% of the total number of projecting regions 1d on knit belt 1a at conveyor belt 2

Figure 9:
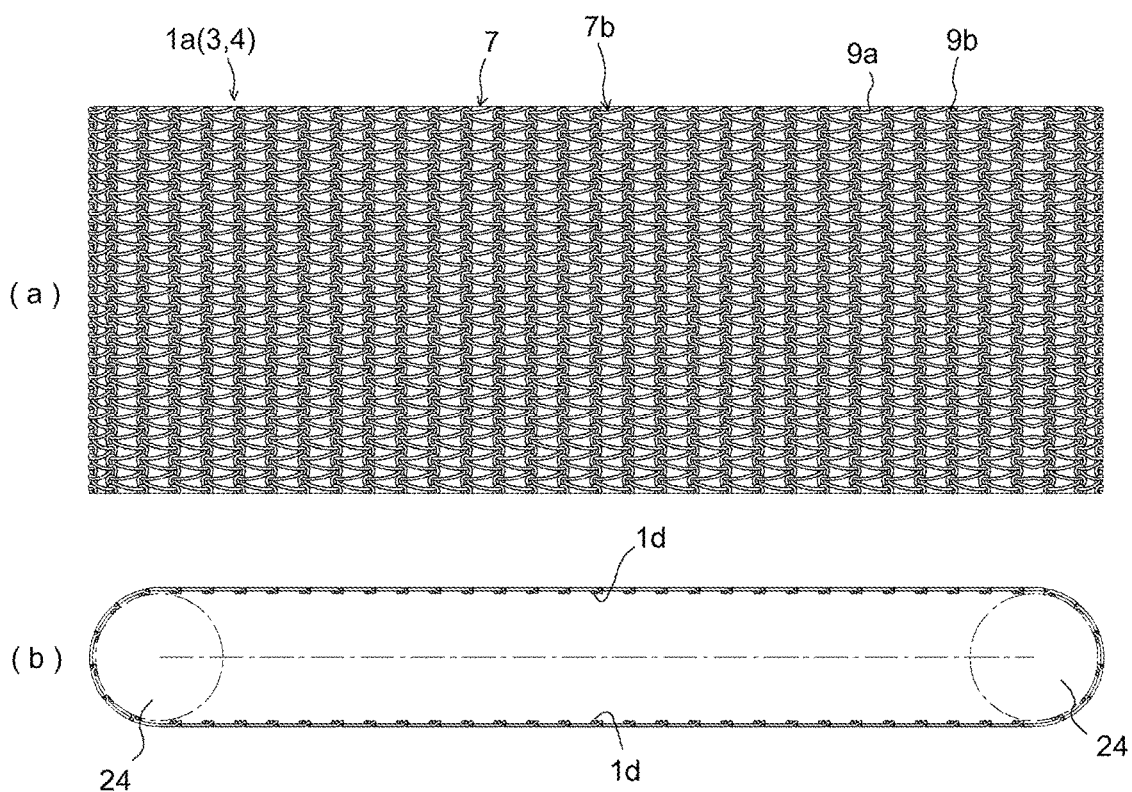
FIG. 9 Knit belt which is warp-knit in accordance with the present invention, (a) being a plan view, and (b) being a schematic sectional view of (a).

Seamless knit belt 4 shown in FIG. 9 is formed from knit fabric 7 which is warp-knit 7b as shown in FIG. 4. FIG. 9 (a) is a plan view of seamless knit belt 4 which is suspended across drive rollers 24, and FIG. 9 (b) is an elevational view as seen from the side of seamless knit belt 4 as viewed along the drive roller 24 axial direction. Here, projecting regions 1*d* which protrude from the back surface 1*c* of knit belt 1*a* are formed in parallel fashion with respect to the directions of the axes of drive rollers 24.

FIG. 10 shows examples of yarns 10 which might be used at a knit belt 1*a* in accordance with the present invention. FIG. 10 (*a*) shows a core yarn 11 comprising single-ply yarn which is artificial-fiber filament 15, i.e., monofilament 15*a*; and FIG. 10 (a') shows a cross-sectional view thereof. FIG. 10 (*b*) shows a covered knitting yarn 10*b* which is an example in which core yarn 11 having monofilament 15*a* at FIG. 10 (*a*) is covered with a covering yarn 14 having elastic fiber 15*g*; and FIG. 10 (b') shows a cross-sectional view thereof. FIG. 10 (*c*) shows a twisted knitting yarn 10*c* which is an example in which there is a core yarn 11 and filament 13 twisted thereabout, filament 13 having elastic fiber 15*g* being twisted about core yarn 11 having monofilament 15*a* at FIG. 10 (*a*); and FIG. 10 (c') shows a cross-sectional view thereof. FIG. 10 (*d*) shows a plated knitting yarn 10*d* which is an example in which core yarn 11 having monofilament 15*a* at FIG. 10 (*a*) is plated with a plating yarn 12 having elastic fiber 15*g*; and FIG. 10 (d') shows a cross-sectional view thereof.

FIG. 11 shows examples of yarns 10 which might be used at a knit belt 1*a* in accordance with the present invention, these yarns 10 being formed from modified cross-sectional shapes. FIG. 11 (*e*) shows a covered knitting yarn 10*e* which is an example in which core yarn 11 is of modified cross-sectional shape, covering yarn 14 being wrapped about and covering the periphery of that core yarn 11 of modified cross-section 16; and FIG. 11 (e') shows a cross-sectional view thereof. FIG. 11 (*f*) shows a knitting yarn 10*f* in which the covering yarn is of modified cross-section, being an example in which covering yarn 14*a* of modified cross-sectional shape is wrapped about and covers the periphery of core yarn 11; and FIG. 11 (*f*) shows a cross-sectional view thereof. FIG. 11 (*g*) shows a knitting yarn 10*g* which is an example of twisted yarn in which the yarn twisted thereabout includes yarn of modified cross-section, filament 15 having elastic fiber 15*g* of modified cross-section being twisted about core yarn 11 comprising artificial fiber having monofilament 15*a*; and FIG. 11 (g') shows a cross-sectional view thereof. FIG. 11 (*h*) shows a plated knitting yarn 10*h* which is an example in which core yarn 11 having monofilament 15*a* is plated with a plating yarn 12*a* of modified cross-section which is elastic fiber 15*g* of shape such that the cross-section thereof comprises three mutually adjacent peaks; and FIG. 10 (h') shows a cross-sectional view thereof. By thus using yarn of modified cross-sectional shape to make a conveyor belt 2, there is an increase in yarn surfaces which come in contact with the conveyed object that is conveyed by the conveyor belt 2, permitting the conveyed object to be conveyed in more stable fashion, and there is furthermore an increase in yarn surfaces which come in contact with drive rollers 3.

Moreover, respectively employing plating yarn 12 and plating yarn 12*a* of modified cross-section, and/or yarn 13 of ordinary cross-section included within twisting yarn and/or yarn 13*a* of modified cross-section included within twisting yarn with which twisting is carried out, and/or covering yarn 14 and/or covering yarn 14*a* of modified cross-section having coefficient of friction different from that of core yarn 11, at plating yarn 12 and/or plating yarn 12*a* of modified cross-section to carry out plating with respect to core yarn 11, and yarn 13 of ordinary cross-section included within twisting yarn and/or yarn 13*a* of modified cross-section included within twisting yarn to be twisted about core yarn 11, or covering yarn 14 and/or covering yarn 14*a* of modified cross-section to cover core yarn 11, makes it possible to alter the coefficients of friction at the front surface 1*b* and/or the back surface 1*c* of knit belt 1*a* relative to what these would be in a knit belt 1*a* employing only monofilament 15*a*, and moreover makes it possible to manufacture a conveyor belt 2 in which there are different coefficients of friction at the front surface 1*b* and the back surface 1*c* of the knit belt 1*a*. Also, where yarn which is covered knitting yarn 10*b* and/or covered knitting yarn 10*e* in which the core yarn is of modified cross-section and/or knitting yarn 10*f* in which the covering yarn is of modified cross-section, and where twisted knitting yarn 10*c* and/or knitting yarn 10*g* in which the yarn twisted thereabout includes yarn of modified cross-section, is employed, it will be possible to provide a coefficient of friction that is different from the coefficient of friction in a knit belt 1*a* which employs only core yarn 11, and it will be possible to cause the coefficients of friction at the front surface 1*b* and the back surface 1*c* of the knit belt 1*a* to be formed such that they are approximately the same. On the other hand, with plating employing plated knitting yarn 10*d* having plating yarn 12 and/or plating yarn 12*a* of modified cross-section and/or knitting yarn 10*h* in which the yarn for plating is of modified cross-section, it will be possible to cause the coefficient of friction at the back surface 1*c* and the coefficient of friction at the front surface 1*b* of the knit belt 1*a* to be formed such that they are mutually different. In addition, for prevention of displacement of covering yarn 14 and/or covering yarn 14*a* of modified cross-section relative to core yarn 11 at covered knitting yarn 10*b*, and for prevention of displacement of plating yarn 12 and/or plating yarn 12*a* of modified cross-section relative to core yarn 11 in plating, causing covering yarn 14 and/or covering yarn 14*a* of modified cross-section, or plating yarn 12 and/or plating yarn 12*a* of modified cross-section, to be thermally fused to the core yarn 11 at the time of heat-setting will make prevention of such displacement possible. Accordingly, by employing yarn of lower melting point than core yarn 11 as covering yarn 14 and/or covering yarn 14*a* of modified cross-section, or plating yarn 12 and/or plating yarn 12*a* of modified cross-section, it will be possible to easily carry out thermal fusing and to prevent displacement of such yarns. Furthermore, by employing plated knitting yarn 10*d* which is knitting yarn 10 in which there is plated therein urethane fiber of high coefficient of friction, and twisted knitting yarn 10*c* in which urethane fiber of high coefficient of friction is twisted about core yarn 11, and/or covered knitting yarn 10*b* in which the covering yarn is urethane fiber of high coefficient of friction, as material for low-melting-point elastic fiber 15*e*, it will be possible to achieve even further improvement in coefficient of friction. Note that as material for monofilament 15*a* at core yarn 11, this may be a material chosen from among Nylon (trade name), polyester, acrylic, polyethylene, and/or other such artificial fibers; where core yarn 11 is electrically conductive filament 15*f*, this may be electrically conductive filament or the like in which fine electrically conductive particles have been kneaded into carbon fiber, metal fiber, and/or artificial fiber; elastic fiber 15*g* may be polyurethane fiber, polyether- or ester-type fiber, and/or other such elastic fiber; as filament 15*c* of coefficient of friction higher than core yarn 11, this may be elastomeric fiber, fiber in which the filament surface has been roughened, and/or the like; and as filament which is elastic fiber of melting point lower than core yarn 11, this may be polyurethane and/or the like.

Figure 12:
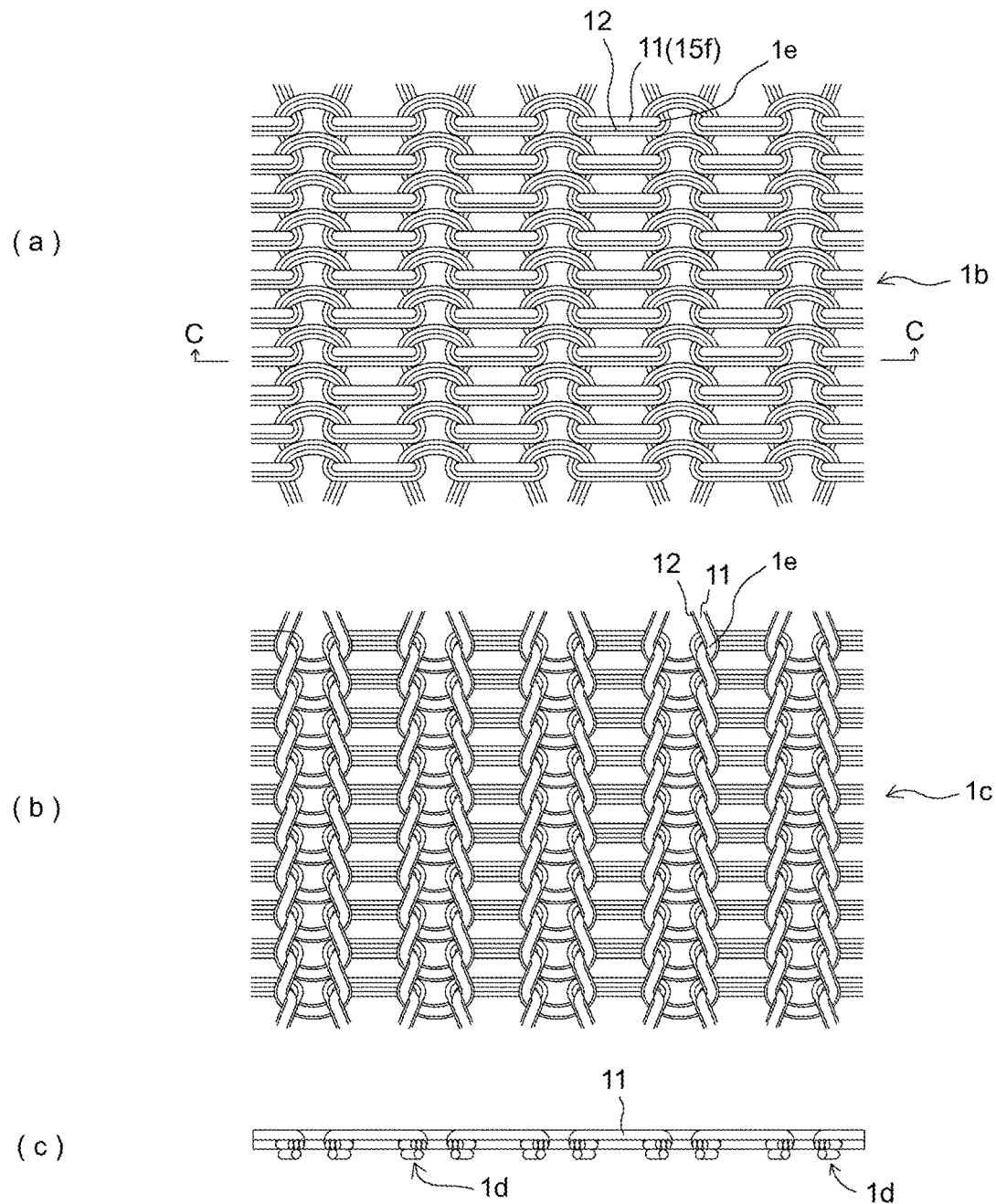
FIG. 12 Diagrams showing stitches in a knit belt in which plating has been carried out using plating yarn of modified cross-section in weft-knit in accordance with the present invention, being a belt in which projecting regions produced by entanglement are at the back surface, (a) being a front view, (b) being a rear view, and (c) being a sectional view of a horizontal section as seen in the direction indicated by c-c at (a).

FIG. 12 shows a schematic diagram of plating using plating yarn 12*a* of modified cross-section, and in which projecting regions produced by entanglement of yarn are arranged at the back surface of knit belt 1a, and in which the back surface 1c and the front surface 1b of knit belt 1a have different coefficients of friction. As shown in FIG. 12, plating using plating yarn 12a of modified cross-section is such that knitting yarn 10h is arranged so as to cause the back surface 1c and the front surface 1b of knit belt 1a to be different, making it possible for the coefficients of friction to be made different at the back surface 1c and the front surface 1b of knit belt 1a. Also, (a) in FIG. 12 is a front surface view showing the front surface 1b of knit belt 1a which is plated with plating yarn 12; (b) in FIG. 12 is a back surface view showing the back surface 1c of knit belt 1a which is plated with plating yarn 12; and (c) in FIG. 12 is sectional view of (a) in FIG. 12, projecting regions 1d on the side thereof which is the back surface 1c being shown.

In addition, as is clear from covering yarn 14 and/or covering yarn 14a of modified cross-section and from plating yarn 12 and/or plating yarn 12a of modified cross-section in FIG. 10, FIG. 11, and FIG. 12, covering yarn 14 and/or covering yarn 14a of modified cross-section or plating yarn 12 and/or plating yarn 12a of modified cross-section is/are present in intervening fashion with respect to core yarn 11, making it possible to prevent the conveyed object from coming in direct contact with core yarn 11. Moreover, by employing yarn comprising electrically conductive filament 15f at core yarn 11, the covering yarn 14 and/or covering yarn 14a of modified cross-section or plating yarn 12 and/or plating yarn 12a of modified cross-section which intervenes therebetween will permit formation of gap(s) between it/them and electrically conductive filament 15f, making it possible through gap discharge to, while conveying a conveyed object, remove excess charge that has accumulated thereon. Note that removal of charge may be facilitated by causing electrically conductive filament 15f to be in a state in which it is grounded to earth or in a state in which a voltage can be applied thereto. Furthermore, with respect to exposure of electrically conductive filament 15f, this may be arbitrarily adjusted depending on thickness and number of turns per unit length of the dielectric covering yarn 14 and/or covering yarn 14a of modified cross-section; furthermore, with plating yarn 12 and/or plating yarn 12a of modified cross-section, varying thickness will permit adjustment of exposure of electrically conductive filament 15E The electrical discharge phenomenon involved in such charge removal is governed by Paschen's law for small-distance discharges, and as the diameter(s) of the covering yarn 14 and/or covering yarn 14a of modified cross-section, and/or the diameter(s) of the plating yarn 12 and/or plating yarn 12a of modified cross-section, will be important, it is preferred that what is employed have yarn diameter(s) of not more than 200 µm.

Figure 13:
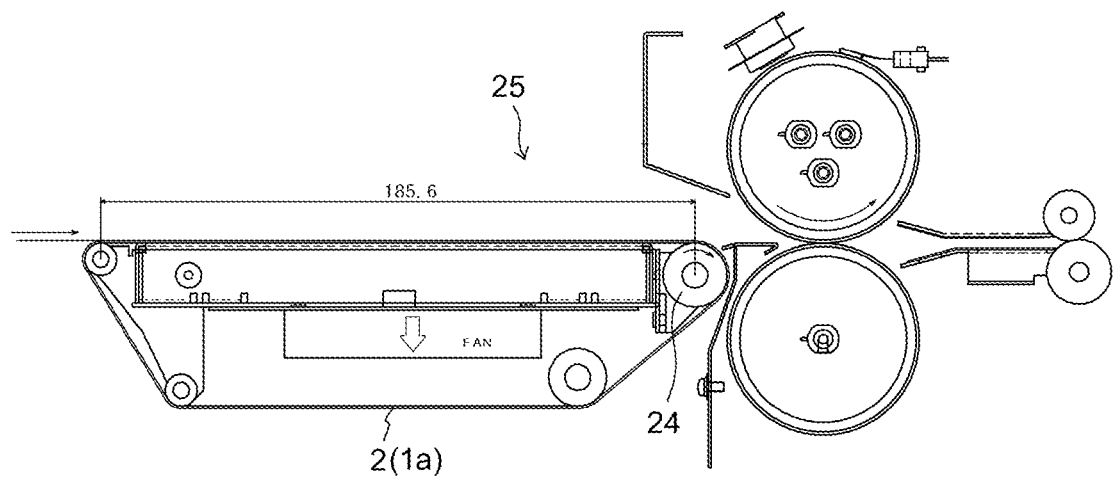
FIG. 13 Side view showing an example of a conveyor apparatus employing a knit belt comprising knit fabric in accordance with the present invention.

FIG. 13 is a drawing showing a conveyor unit in a conveyor apparatus 25 in which a knit belt 1a is employed at conveyor belt 2. Furthermore, conveyance characteristics of lightweight paper or other such conveyed object in the context of the constitution of FIG. 13 are being ascertained. Moreover, FIG. 14 shows an example of a conveyor apparatus 25 at a time when knit belt 1a is employed at conveyor belt 2. Furthermore, FIG. 15 shows a drawing for reference for when a knit belt 1a is employed as a drive belt 3. As shown in this FIG. 15, areas in which there are projecting regions 1d that are different from the non-entangled regions 1f produced by mutual entanglement of knitting yarn 10 are formed at the back surface 1c of knit belt 1a. Utilizing these areas in which there are projecting regions 1d, grooves 26a are formed on the surface of the roller at drive roller 26, and grooves 27a having the same groove shape as the grooves 26a of drive roller 26 are likewise formed at idler roller 27 at the driven side, to form a constitution permitting transmission of drive force. Furthermore, as a result of adoption of such a constitution, whereas dust, powder produced by abrasion, and so forth over long periods of usage of a conventional rubber conveyor belt or rubber drive belt becomes compacted by drive roller 24 or the drive roller 26 at drive belt 3 shown in FIG. 5 and is made to adhere to the inside surface of drive belt 3 or conveyor belt 2, as a result of employment of knit belt 1a in accordance with the present invention, dust, powder produced by abrasion, and so forth enters the gaps at loops 9 constituting the stitches of knit belt 1a, permitting reduction in that which adheres to the inside surface of the belt, and making it possible for this knit belt 1a to produce stable conveyance or transmission of drive force.

Working Examples

TABLE 1 lists filament material, whether heat-setting was carried out, and various other characteristics of Working Examples 1 through 6, which are knit belts 1a comprising knit fabric 7 which is weft-knit 7a associated with the present invention, and Comparative Example 1, which is a mesh belt comprising woven fabric made in plain weave for purposes of comparison therewith. At this TABLE 1, Working Examples 1 through 4 were such that a seamless knit belt 4, as is for example shown in FIG. 8, comprising knitting in which, to increase coefficient of friction, urethane filament elastic fiber comprising modified cross-section as shown at (h) in FIG. 11 was used as plating yarn 12a of modified cross-section to carry out plating of a core yarn 11 which was Nylon (trade name) filament. Working Example 5 indicates a seamless knit belt 4 constituted of only monofilament 15a. Moreover, Working Example 6 indicates a seamless knit belt 4 that was formed such that Nylon (trade name) filament which was monofilament 15a was used as core yarn 11, over which elastic fiber which was urethane filament having modified cross-section was employed as covering yarn 14a, as shown at (f) in the same FIG. 11. Comparative Example 1 was a mesh belt which was woven fabric made in plain weave woven at 60 threads per inch, respectively, from warp yarn and weft yarn comprising ordinary filament 15.

TABLE 1

|  | Working Example 1 | Working Example 2 | Working Example 3 | Working Example 4 | Working Example 5 | Working Example 6 | Comparative Example 1 |
| --- | --- | --- | --- | --- | --- | --- | --- |
| Mesh configuration | Knit fabric | Knit fabric | Knit fabric | Knit fabric | Knit fabric | Knit fabric | Woven fabric |
| Filament material | Core yarn: Nylon 220 D/F (170 µm) | Core yarn: Nylon 220 D/F (170 µm) | Core yarn: Nylon 110 D/F (120 µm) | Core yarn: Nylon 110 D/F (120 µm) | Core yarn: Nylon 220 D/F (170 µm) | Core yarn: Nylon Core: Nylon 220 (D/F) | Polyester (150 µm) 60 (threads/inch) |

TABLE 1-continued

|  | Working Example 1 | Working Example 2 | Working Example 3 | Working Example 4 | Working Example 5 | Working Example 6 | Comparative Example 1 |
|---|---|---|---|---|---|---|---|
|  | Plating yarn: Urethane of modified cross-section 110 (D/F) | Plating yarn: Urethane of modified cross-section 110 (D/F × 2) | Plating yarn: Urethane of modified cross-section 110 (D/F) | Plating yarn: Urethane of modified cross-section 110 (D/F × 2) | — | Plating yarn: Urethane of modified cross-section 110 (D/F × 2) | Urethane-coated surface |
| Heat-setting (115° C. steam) | Yes | Yes | Yes | Yes | Yes | Yes | Yes |
| Distance (mm) in stitch direction: $Ps_0$ (distance between where loops make contact (calculated value)) | 0.68 | 0.81 | 0.53 | 0.68 | 0.53 | — | — |
| Measured value: $Ps_1$ | 0.39 | 0.4 | — | 0.5 | 0.4 | — | — |
| Airflow resistance (kPa·s/m) | 0.0047 | 0.0114 | 0.003 | 0.0069 | 0.0027 | 0.0091 | 0.0045 |
| Static coefficient of friction: front (as measured according to JIS) | 0.93 | 0.88 | 0.90 | 0.90 | 0.23 | 0.839 | 1.08 |
| Static coefficient of friction: back (as measured according to JIS) | 0.22 | 0.51 | 0.19 | 0.22 | 0.28 | 0.919 | 0.21 |
| Belt buckling strength (load) | 550 g | — | — | — | — | — | 490 g |
| Fraying at edges (as determined by rubbing with No. 120 sandpaper) | ○ | ○ | ○ | ○ | ○ | — | x |

At indicated at TABLE 1, upon comparing the working examples of the present invention and the comparative example with respect to air permeability, i.e., resistance to airflow, it was found that Working Example 1 had an airflow resistance value of 0.0047 kPa·s/m, and Comparative Example 1 which was a mesh belt comprising woven fabric of ordinary filament 15 had an airflow resistance value of 0.0045 kPa·s/m, these being of roughly equivalent magnitude, while Working Examples 2 through 6 had airflow resistance values which were in the range 0.0027 to 0.0114 kPa·s/m. Accordingly, in accordance with the present invention, it is clear that airflow permeability of knit belt 1a comprising knit fabric 7 which is weft-knit 7a can be arbitrarily adjusted to any desired value within the range of the Working Examples.

With respect to coefficient of friction, knitting in which urethane filament that was elastic fiber was used as plating yarn 12a of modified cross-section made it possible to impart a coefficient of friction of approximately 1.0 to the front surface 1b of knit belt 1a, this being the face where it was required, and permitted knit belt 1a to be constituted such that the coefficient of friction at the back surface 1c of knit belt 1a was the same level as for a belt comprising only Nylon (trade name) filament at core yarn 11. Based on the foregoing, it is possible to constitute a conveyor belt 2 comprising different coefficients of friction at the front surface 1b and the back surface 1c of knit belt 1a. Moreover, use of urethane filament at covering yarn 14a of modified cross-section made it possible to obtain a coefficient of friction that was higher than that of yarn comprising only monofilament 15a, and it is clear that it is possible to manufacture a conveyor belt 2 comprising more or less the same coefficient of friction at the back surface 1c and the front surface 1b of knit belt 1a. Furthermore, in comparing fraying at the side ends 5 of a conventional plain-weave mesh belt in accordance with the comparative example and fraying at the side ends 5 of knit belts 1a in accordance with the invention, as a result of rubbing the surfaces at the side ends 5 of these belts with No. 120 sandpaper, it was determined that there was fraying at the plain-weave mesh belt after 1 to 2 rubs, which fact is indicated at TABLE 1 by x. In contrast, with knit belts 1a in accordance with the present invention, the results were satisfactory, no fraying phenomena being observed despite their having been rubbed 10 or more times, which fact is indicated at TABLE 1 by O.

TABLE 2

|  | Working Example | | Comparative Example 2 |
|---|---|---|---|
| Belt type | Belt at Working Example 3 | Belt at Working Example 6 | Rubber belt (hole diameter: φ6) |
| Projecting regions due to | Back | Back | — |

TABLE 2-continued

|  |  | Working Example | | Comparative Example 2 |
| --- | --- | --- | --- | --- |
| entangled regions | | surface of belt | surface of belt | |
| Coefficient of friction at belt surface | | 0.9 | 0.839 | 0.7 |
| Relative occurrence of jamming | Business-card-size paper (weight = 0.8 g) | With suction of air | 0% | 0% | 26% |
| | | Without suction of air | 0% | 0% | 88% |
| | Japanese Western-style No. 2 envelope | With suction of air | 0% | 0% | 16% |
| | | Without suction of air | 0% | 0% | 92% |

Moreover, TABLE 2 indicates the structure of a rubber belt in accordance with Comparative Example 2 in which a multiplicity of holes of diameter 6 mm were arranged and the structures of knit belts 1a in accordance with the foregoing Working Example 3 and Working Example 6, as well as conveyance characteristics, when 50 sheets each of Japanese Western-style No. 2 envelopes (162 mm×114 mm; listed in TABLE 2 as "Japanese Western-style No. 2 envelope") and business-card-size (91 mm×55 mm) paper shorter than the length of knit belt 1a when knit belt 1a was held under tension were employed as conveyed objects conveyed using conveyor belt 2 having knit belt 1a comprising knit fabric 7 which was weft-knit 7a associated with the present invention. As indicated at TABLE 2, knit belts 1a at the foregoing Working Example 3 and Working Example 6 were such that entangled region projections, i.e., projecting regions 1d at entangled regions 1e, were arranged at the belt back surface, i.e., the back surface 1c of the knit belt 1a. Coefficients of friction at the belt surface were 0.9 for the knit belt 1a of Working Example 3, 0.839 for the knit belt 1a of Working Example 6, and 0.7 for the rubber belt of Comparative Example 2. Relative occurrence of jamming (a low value indicating satisfactory conveyance characteristics) and conveyance characteristics of Japanese Western-style No. 2 envelopes and conveyance characteristics of conveyed objects of weight 0.8 g in the form of business-card-size paper at Comparative Example 2 and Working Example 3 and Working Example 6 in accordance with the present invention was 0% in all cases for the knit belt 1a at Working Example 3 regardless of whether or not there was suction of air via the stitches. In contradistinction hereto, with the rubber belt at Comparative Example 2, relative occurrence of jamming for business-card-size paper was 26% with air suction and was 88% without air suction, and for Japanese Western-style No. 2 envelopes this was 16% with air suction and 92% without air suction. Accordingly, it was determined that the conveyor belt 2 comprising knit belt 1a in accordance with the present invention exhibits improved force of friction (gripping characteristics) with respect to conveyed objects; and that with a conveyor apparatus 25 having a seamless knit belt 4, even when air suction is not applied by a fan from a location below the seamless knit belt 4, as can be seen at (a) in FIG. 14, it is possible to carry out conveyance even of lightweight conveyed objects such as paper or the like, without occurrence of jamming With the rubber belt of Comparative Example 2, which was a conventional perforated belt, while a difference was observed depending on whether or not air suction was employed, it being clear that conveyance characteristics were poor in comparison with those of a conveyor belt 2 in accordance with the present invention, as compared with a conventional rubber belt, a conveyor belt 2 in accordance with the present invention permits conveyance of lightweight conveyed objects even without use of air suction. Furthermore, this permits contributions with respect to energy conservation, such as the fact that where air suction is carried out it will be possible to do so using an air suction fan which is of smaller size than was the case conventionally. Note that the conveyor apparatus 25 employed in the foregoing testing of conveyance characteristics is shown in FIG. 13.

As described above, FIG. 14 is an example of a conveyor apparatus 25 which employs a knit belt 1a comprising knit fabric in accordance with the present invention as conveyor belt 2, and while suction apparatus(es) employing fan(s) may be provided as necessary at conveyor belts 2 comprising seamless knit belt 4 which is wrapped around conveyor apparatus 25, conveyance of extremely lightweight conveyed things may be carried out in accordance with the present invention in stable fashion and without driving of suction apparatus(es). FIG. 14 (a) is a plan view, FIG. 14 (b) is a side view, and FIG. 14 (c) is an elevational sectional view showing a plurality of drive belts 3 and a plurality of drive rollers 24.

Moreover, where yarn comprising artificial fiber is formed from synthetic-fiber thermoplastic filament 15b for use as knitting yarn 10 in knit belt 1a in accordance with the present invention, it may be that stitch loops 9 become elongated due to heat-setting. Even where loops 9 have become elongated in such fashion, because steps comprising projecting regions 1d are present at knit belt 1a, it will be possible for projecting regions 1d to engage with grooves 26a present on the outside circumference of drive roller 26, as shown for example in FIG. 15; and by also forming grooves 27a at the driven idler roller 27 which are similar to grooves 26a present at the outside circumference and causing engagement therewith by projecting regions 1d, it will be possible to definitively transmit drive force. Accordingly, knit belt 1a is therefore not limited to use only as a conveyor belt 2 but may be used as a timing belt or the like for use as drive belt 3.

FIG. 16 shows a drawing for reference for an apparatus in which paper or other such sheet-like object 28 is sandwiched by knit belt 1a and guide 30 made from resin, and knit belt 1a is made to rotate by drive roller 24, causing knit belt 1a to engage in rotary motion; and in which sheet-like object 28 is squeezed on by knit belt 1a against opposing resin guide 30, the force of friction at the surface of knit belt 1a causing sheet-like object 28 to be conveyed. Sheet-like object 28 may thus be conveyed while in a state in which it is sandwiched by knit belt 1a. Furthermore, while not shown in the drawing, where respective knit belts 1a are employed in mutually sandwiching fashion, it is also possible to cause a conveyed object to be conveyed as a result of causing rotary motion of the respective knit belts 1a. Moreover, because conveyance may be carried out by sandwiching in this manner, it is possible to carry out conveyance in stable fashion even for objects of small thickness that are also of small size; and because knit belt 1a comprises knit fabric, knit belt 1a being flexible, it is possible to carry out driving even with drive roller(s) of small diameter, which had been difficult conventionally.

Figure 17:
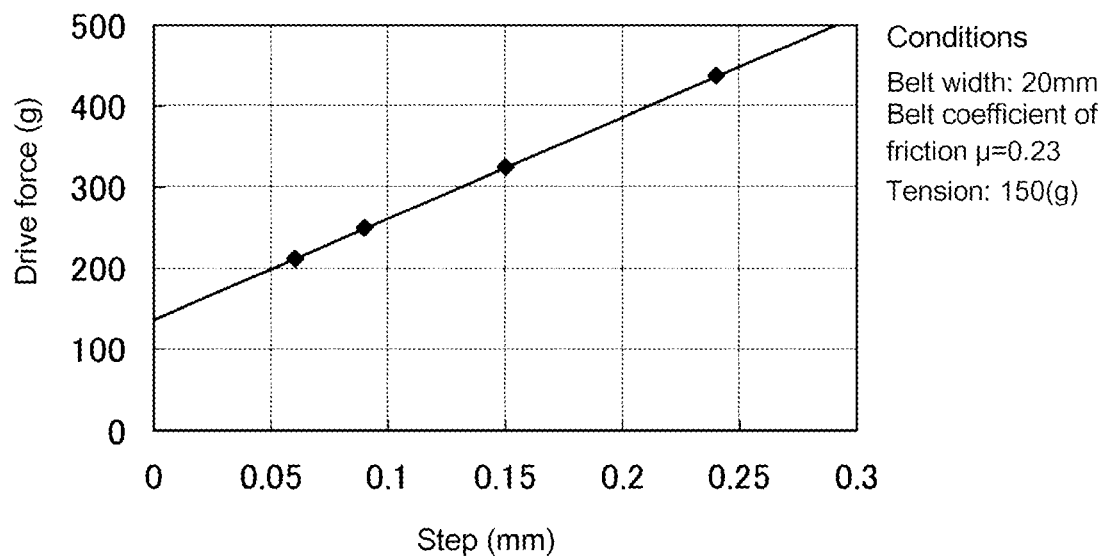
FIG. 17 Graph showing relationship between drive force and steps due to protruding regions at entanglement of loops in knit belt of width 20 mm.

FIG. 17 is a diagram showing a graph of testing of the step required for transmission of drive force, the graph showing the relationship between drive force and height of a step comprising a projecting region 1*d* present at knit fabric 7 forming a knit belt 1*a* of width 20 mm at a tension of 150 g and having a coefficient of friction μ of 0.23. It is clear that under the conditions present at knit belt 1*a* shown in this graph, as the size of the steps comprising projecting regions 1*d* present at knit fabric 7 forming knit belt 1*a* was increased from 0.006 mm to 0.24 mm, the drive force per unit length also increased in proportion thereto in linear fashion as it went from 210 g to 440 g. It is clear that by causing steps to be present in such fashion, this will be fully capable of being used as a belt for transmitting small drive forces.

FIG. 18 shows knit pattern 8 at knit fabric 7 in accordance with the present invention, in which adjacent loops 9 in the gauge direction, i.e., conveying direction 17, have different dimensions; that is, knit fabric 7 has large loops 9*a* and small loops 9*b*, which are of different dimensions. Knit fabric 7 at (a) in FIG. 18 is a diagram of stitches at which plastic deformation has not taken place, plastic deformation causing the amount of looping to be reduced and causing formation of stitches as shown at (b) in FIG. 18. Applying tension to the knit fabric 7 at (b) in FIG. 18 and causing it to be held under tension until the amount of slack in the yarn reaches a minimum produces the knit pattern 8 of the knit fabric 7 at (c) in FIG. 18. Moreover, applying further tension to the knit fabric 7 at (c) in FIG. 18 causes it to be held under tension until small loops 9*b* deform and the amount of slack reaches a minimum, producing the knit pattern 8 of the knit fabric 7 at (d) in FIG. 18. That is, stitches are formed such that there are large loops 9*a* and small loops 9*b*, plastic deformation causes the amount of slack at large loops 9*a* to be reduced, and low-tension domains in which there is elongation due to locations at which there is slack in large loops 9*a* are reduced, so that by utilizing tension due to deformation of small loops 9*b*, which are not easily made to undergo deformation, even when in a state in which there is little percent elongation of the belt, it becomes possible to achieve a tension that could not be obtained with a conventional knit belt. Furthermore, by thus forming small loops 9*b* and large loops 9*a*, and by causing small loops 9*b* to be arranged in dense fashion in the stitch direction, i.e., width direction 18, it will be possible to reduce the amount of change in the width direction when this is extended in the conveying direction 17, making it possible to obtain a knit belt 1 in which this is at a level that does not pose a problem for use as a conveyor belt 2.

Figure 19:
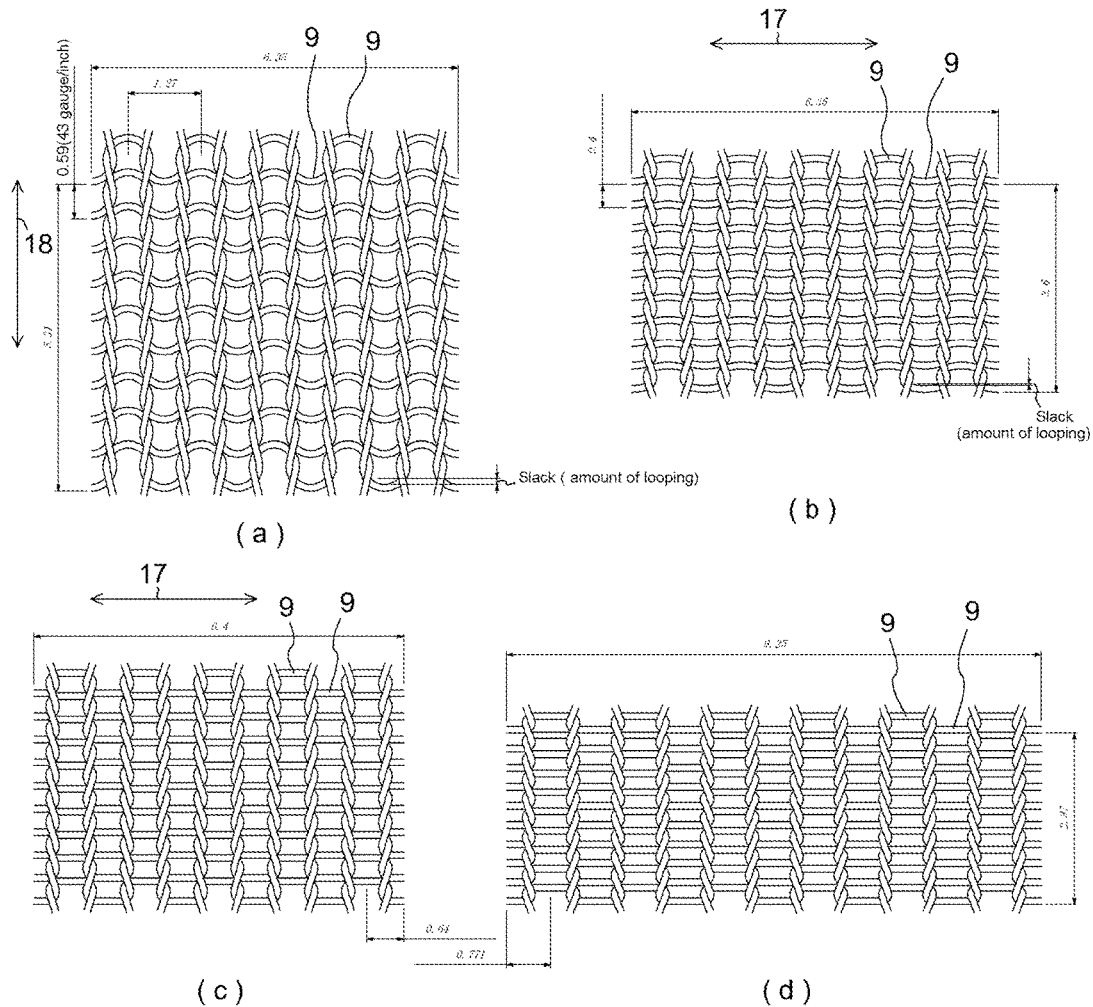
FIG. 19 Diagrams of comparative examples showing knit fabric which is conventional weft-knit fabric in which dimensions of mutually neighboring loops are the same, (a) being a diagram showing the situation before application of tension, this being a schematic view in which the slack at loops is large; (b) being a schematic view of a situation in which the knitting yarn has been made to undergo plastic deformation and in which dimensions of adjacent loops are the same; (c) being a schematic view of the situation obtained when the knit fabric at (b) is held under tension and slack is at a minimum; and (d) being a schematic view of the situation obtained when (b) is subjected to further tension, this schematic view illustrating that the amount of change is large in both the width direction and the conveying direction, and that size of the knit fabric is reduced in the width direction.

FIG. 19 shows knit pattern 8 at knit fabric 7 for comparison with the present invention, in which adjacent loops 9 in the gauge direction, i.e., conveying direction 17, have the same dimensions; that is, knit fabric 7 comprises conventional stitches in which all loops 9 have the same dimensions, there being no large loops 9*a* or small loops 9*b*. Knit fabric 7 at (a) in FIG. 19 shows stitches at a time when plastic deformation has not taken place; increasing density of loops 9 in the stitch direction, i.e., width direction 18, and causing plastic deformation of loops 9 to occur causes the amount of looping to grow small everywhere together, and assume a state as shown at (b) in FIG. 19. Applying tension in the conveying direction 17 at the knit fabric 7 at (b) in FIG. 19 causes the slack in the yarn to reach a minimum with only a small amount of elongation, producing the knit pattern 8 of the knit fabric 7 at (c) in FIG. 19. However, if further tension is applied, the knit fabric 7 at (c) in FIG. 19 assumes a state in which deformation of any adjacent loops 9 in the conveying direction 17 causes elongation to occur more readily than is the case with knit belt 1*a* in accordance with the present invention, causing tension as a function of elongation to be small, and making it difficult to achieve sufficient tension at elongations produced when this is held under tension. Furthermore, in the width direction 18 as well, deformation of any adjacent loops 9 causes a state to be assumed in accompaniment thereto which is more contracted in the stitch direction which is the width direction 18 than is the case with knit belt 1*a* in accordance with the present invention, producing a knit belt 1*a* that is difficult to use. After passing through such states affecting the conveying direction 17 and the width direction 18, knit pattern 8 of knit fabric 7 assumes the state shown at (d) in FIG. 19.

Figure 20:
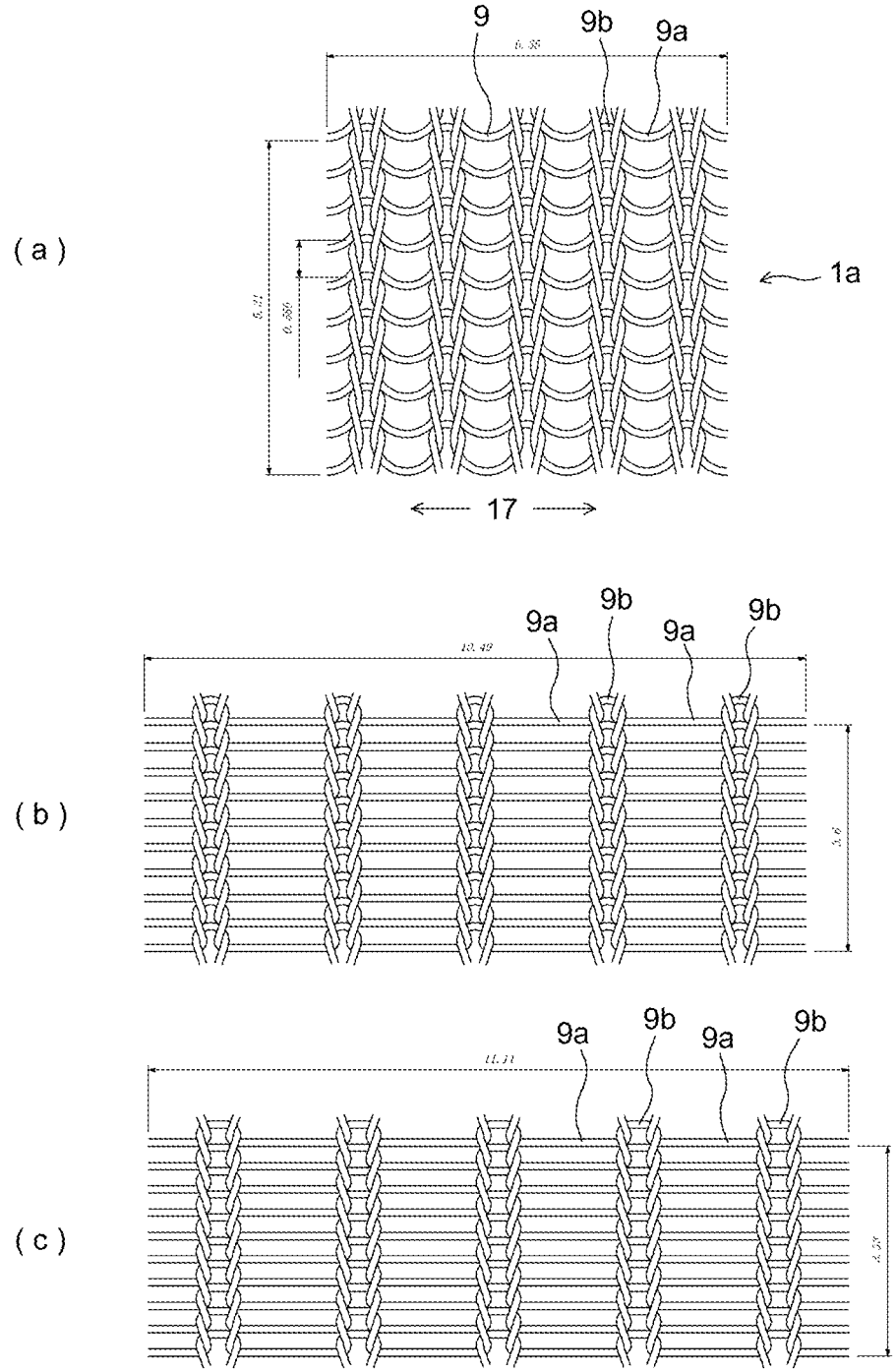
FIG. 20 Drawing showing change in elongation (in a situation in which loops are of different dimensions) in a state in which plastic deformation has not been made to occur at weft-knit fabric in a comparative example.

FIG. 20 shows knit pattern 8 at knit fabric 7 for comparison with the present invention, in which, in a state in which plastic deformation has not been made to occur, adjacent loops 9 in the gauge direction, i.e., conveying direction 17 have different dimensions; that is, knit fabric 7 has large loops 9*a* and small loops 9*b*, which are of different dimensions. Knit fabric 7 at (a) in FIG. 20 has stitches comprising large loops 9*a* and small loops 9*b* that have not undergone plastic deformation, a state in which tension is not applied being shown in the drawing. (b) at FIG. 20 shows a diagram of when this has been stretched in the conveying direction 17 and slack at large loops 9*a* it at a minimum. (c) at FIG. 20 shows a diagram of a state that is assumed after (b) at FIG. 20 has been stretched further and small loops 9*b* have become deformed. Thus, at knit belt 1*a* in which large loops 9*a* and small loops 9*b* that have not undergone plastic deformation are formed, there being a large amount of slack due to large loops 9*a*, elongation in the conveying direction 17 would become large before this would reach a minimum, elongation occurring with little production of tension. That is, elongation would become large before small loops 9*b* could be deformed sufficiently to produce the required tension, making tension low, which fact may be taken as an indication that were this to be used as a conveyor belt 2 it would be a belt that would be difficult to use.

Figure 21:
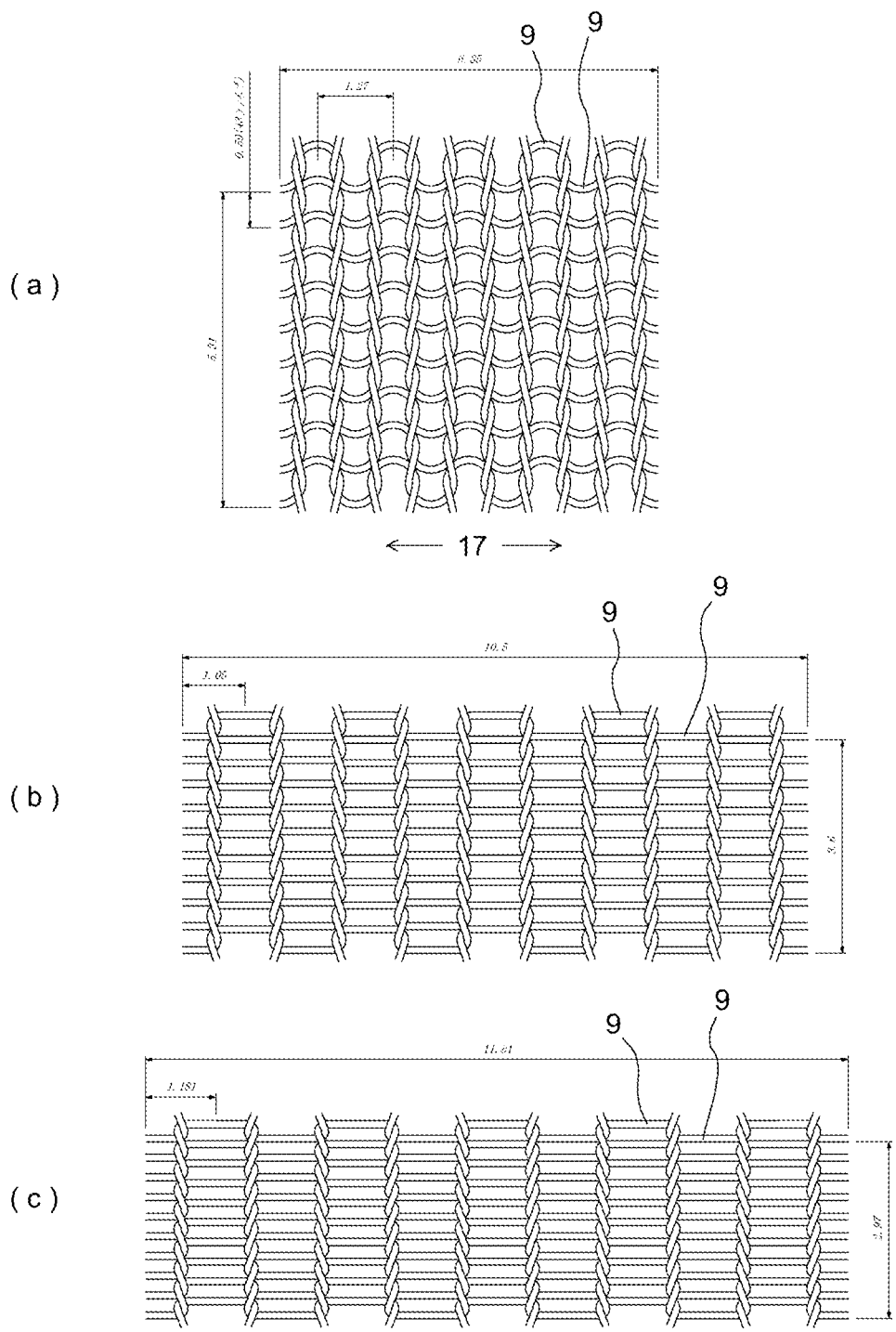
FIG. 21 Drawing showing change in elongation (in a situation in which loops are of identical dimensions) in a state in which plastic deformation has not been made to occur at weft-knit fabric in a comparative example.

FIG. 21 shows knit pattern 8 at knit fabric 7 for comparison with the present invention, in which, in a state in which plastic deformation has not been made to occur, adjacent loops 9 in the gauge direction, i.e., conveying direction 17, have the same dimensions; that is, knit fabric 7 comprises conventional stitches in which all loops 9 have the same dimensions, there being no large loops 9*a* or small loops 9*b*. FIG. 21 (*a*) is a diagram showing knit fabric 7 in a state when it is not under tension and is not being stretched in the conveying direction 17; FIG. 21 (*b*) is a diagram showing a state in which it has been stretched in the conveying direction 17 and slack at loops 9 is at a minimum; and FIG. 21 (*c*) is a diagram showing a state in which it has been further stretched in the conveying direction 17. As shown at (a) in FIG. 21 and at (b) in FIG. 21, a belt having stitches in which identical loops 9 do not undergo plastic deformation is such that elongation as would cause the belt to go from its untensioned state to a state in which slack at loops 9 is at a minimum is large, elongation occurring with little production of tension. That is, elongation would become large before slack at loops 9 could be made to reach a minimum for production of the required tension, making tension low, which fact may be taken as an indication that were this to be used as a conveyor belt 2 it would be a belt that would be difficult to use.

FIG. 22 is a diagram in which the relationship between tension and elongation in knit belts 1*a* in accordance with the present invention is shown in the form of a graph. As shown in FIG. 22, six belt samples (A) through (F) of different tensions (slopes of the lines) were manufactured, and tension and elongation of the knit belts 1*a* were determined, as a result of which it was found that percent elongation due to slack at loops in the knit belts 1a was not more than 2%, after which the knit belts 1a were such as to permit tension to be obtained in linear fashion. Furthermore, the inflection point at about 2% elongation was due to a low-load domain produced by slack at loops 9 as described above, it primarily being deformation of small loops 9b and/or the like which occurred in the mid- to high-tension domains thereafter. In addition, with respect to use of this knit belt 1a, it is preferred that use be in a domain which exceeds this low-load domain, usage of a knit belt 1a having a slope of not less than 0.1 N/cm at 1% elongation being preferred.

As described above, as compared with woven belts and perforated rubber, these being conventional belts, from the standpoints of strength in the width direction 18, flexibility, and so forth, in a field in which use had hitherto been problematic, a knit belt 1a comprising knit fabric 7 which is warp-knit 7b or weft-knit 7a in accordance with the present invention has brought to light, by virtue of adoption of the present invention, potential uses as a belt 1 comprising knit fabric 7; and in addition, has achieved stabilization of coefficient of friction and prevention of curl at side ends 5 of the knit belt 1a, making it possible to carry out conveyance in stable fashion without the need to rely on suction via the stitches of the knit belt 1a constituting the conveyor belt 2 even when the conveyed object is lightweight and of small area; and moreover, has brought to light the fact that it may also be used at a drive belt 3 for transmission of drive force. Accordingly, the knit belt 1a comprising knit fabric 7 which is warp-knit 7b or weft-knit 7a in accordance with the present invention is capable of being used not only as a conveyor belt 2 in a conveyor apparatus 25 but is also fully capable of being used as a drive belt in a drive apparatus.

EXPLANATION OF REFERENCE NUMERALS

1 Belt
1a Knit belt
1b Front (conveying) surface (of the knit belt)
1c Back (drive) surface (of the knit belt)
1d Projecting region
1e Entangled region
1f Non-entangled region
1g Step
2 Conveyor belt
3 Drive belt
4 Seamless knit belt
5 Side end (of the knit belt)
7 Knit fabric
7a Weft-knit
7b Warp-knit
8 Knit pattern
9 (Stitch) loop
9a Large loop
9b Small loop
10 Knitting yarn
10a Knitting yarn which is only monofilament
10b Covered knitting yarn
10c Twisted knitting yarn (yarn having multiple plies)
10d Plated knitting yarn
10e Covered knitting yarn in which the core yarn is of modified cross-section
10f Covered knitting yarn in which the covering yarn is of modified cross-section
10g Twisted knitting yarn in which the yarn twisted thereabout includes yarn of modified cross-section
10h Plated knitting yarn in which the plating yarn is of modified cross-section
11 Core yarn
12 Plating yarn
12a Plating yarn of modified cross-section
13 Yarn of ordinary cross-section included within twisting yarn
13a Yarn of modified cross-section included within twisting yarn
14 Covering yarn
14a Covering yarn of modified cross-section
15 Filament
15a Monofilament (core yarn)
15b Thermoplastic filament
15c Filament having high coefficient of friction
15e Low-melting-point elastic-fiber filament
15f Electrically conductive filament
15g Elastic fiber
16 Modified cross-section
17 Conveying direction (gauge direction)
18 Width direction (axial direction; stitch direction)
20 Projecting portion
22 Upwardly curled region
23 Downwardly curled region
24 Drive roller
25 Conveyor apparatus
26 Drive roller (drive pulley)
26a Groove
27 Idler roller (idler pulley)
27a Groove
28 Sheet-like object
29 Rotating shaft
30 Resin guide
31 Drive gear
Pg Pitch of stitch loops in gauge direction
Ps Pitch of stitch loops in stitch direction
φ Filament diameter
$P_s0$ Distance between intertwinings of filament(s) where there is no deformation of loops
$P_s1$ Distance between intertwinings of filament(s) where there is deformation of loops

The invention claimed is:

1. A seamless conveyor belt, comprising:
a seamless knit belt including knit fabric, which is weft-knit or warp-knit, the knit fabric comprising knitting yarn including core yarn which is a monofilament made up of continuous fibers, and in which there is mutual intertwining of filaments;
wherein the knit fabric includes knit stitches in the form of loops, and dimensions of adjacent loops in a gauge direction, which is a conveying direction, are different sizes,
wherein the knit fabric has a knit pattern in which a pitch Ps of loops in a stitch direction, which is an axial direction, is smaller than a pitch Pg of loops in the gauge direction,
wherein loops at knit stitches coming in mutual contact in the conveying direction have stitch loops which are small loops and large loops,
wherein the knitting yarn undergoes plastic deformation of filaments at locations where the filaments are entangled causing an entangled state to be maintained at filament of loops;
wherein slack, which is an amount of looping, at the large loops is small, and wherein small loops approach, or come in contact with, knitting yarn in the belt width direction, which is the stitch direction, wherein fraying of yarn due to rubbing at side ends and breakage of yarn at mutual monofilament locations due to abrasion during driving or conveying of the belt being prevented even where there is plastic deformation of mutually intertwined filament, and wherein pitch spacing in the stitch direction is shortened; and strength in the conveying direction, which is the drive direction, is improved.

2. The seamless conveyor belt according to claim 1, wherein the seamless knit belt has gaps that are produced by the knit fabric; and flexural stress or heat causing the monofilament knitting yarn to undergo plastic deformation at stitch loop locations where this knitting yarn monofilament mutually intersects and becomes entangled, or the knitting yarn employed in the knit fabric is knitting yarn comprising a plurality of filaments, flexural stress or heat causing the knitting yarn, there being filament exhibiting plastic deformation included among the plurality of filaments, to undergo plastic deformation at stitch loop locations where the plurality of filaments of this knitting yarn mutually intersect and become entangled, such that the entangled state is maintained; and in addition, the knit belt is such that slack at loops and stitches has been stabilized by heat-setting.

3. A seamless conveyor belt according to claim 2, wherein the seamless knit belt is a knit belt which is knit from a plurality of materials;

filament constituting core yarn being knitting yarn comprising monofilament;

knit fabric being such that knitting yarn is mutually intertwined therein;

flexural stress or heat causing the monofilament of the core yarn to undergo plastic deformation at locations of entanglement;

being a knit pattern in which pitch of loops in a stitch direction constituting an axial direction is smaller than pitch of loops in a gauge direction constituting a conveying direction of said knit belt;

mutually contacting loops and filament being made to undergo deformation such that an entangled state of the filament is maintained;

prevention of fraying at belt side ends during conveying by the conveyor belt and shortening of pitch spacing in the stitch direction causing improvement of strength in the conveying direction;

being a seamless knit belt which, being a knit belt comprising a plurality of materials, comprises knit fabric which is formed by knitting in accordance with any one knitting method among three knitting methods, these being:

plating using a core yarn and a yarn which comprises filament of material different from this core yarn as a plating yarn with which the core yarn is plated;

knitting using knitting yarn that is twisted yarn in which there is a core yarn and a yarn which comprises filament of material different from this core yarn and which is twisted thereabout; and knitting using knitting yarn that is covered yarn in which a core yarn is covered by a yarn which comprises filament different from this core yarn; and comprising a knit belt in which a front surface and a back surface of this knit belt have different coefficients of friction or in which the front surface and the back surface of this knit belt have the same coefficient of friction.

4. A seamless conveyor belt comprising a seamless knit belt according to claim 3, wherein the seamless knit belt, in which prevention of fraying of yarn of the knit belt and use of knitting yarn to cause coefficient of friction at the knit belt to be different coefficients of friction at front and back or more or less the same coefficient of friction at front and back have been carried out, is such that monofilament yarn made up of artificial-fiber continuous fiber is used as core yarn;

being a seamless knit belt comprising warp-knit or weft-knit in which filament is mutually intertwined;

the monofilament comprising artificial fiber at this core yarn being yarn comprising high-resistance monofilament or electrically conductive filament comprising artificial fiber;

being a knit belt which is knit using yarn in which the knitting yarn within which this core yarn is included comprises filament of at least two or more different materials; and in addition, reduction in pitch spacing in the stitch direction causes improvement in strength in the conveying direction;

being a seamless knit belt comprising knit fabric chosen from among plating in which a yarn that comprises filament of material different from, and having higher coefficient of friction than a coefficient of friction of, a core yarn is used as a plating yarn for plating;

knitting using knitting yarn that is twisted yarn in which there is a core yarn and a yarn which comprises filament of material different from, and having higher coefficient of friction than a coefficient of friction of, this core yarn and which is twisted thereabout; and knitting using knitting yarn that is covered yarn in which a core yarn is covered by filament of material different from, and having higher coefficient of friction than a coefficient of friction of, this core yarn; and comprising a knit belt in which the front surface and the back surface of the knit belt have different coefficients of friction or in which the front surface and the back surface of the knit belt have the same coefficient of friction.

5. A seamless conveyor belt comprising a seamless knit belt according to claim 4, wherein yarn constituting the knit belt employs a core yarn and filament comprising flexible elastic fiber having coefficient of friction higher than coefficient of friction of the core yarn;

there is improvement in coefficient of friction of the knit belt; and there is increase in a gripping force which is at least one of a gripping force which is a force of friction between a conveyor belt comprising the knit belt and a conveyed object placed on or sandwiched by the conveyor belt comprising this knit belt, and a gripping force which is a force of friction between a conveyor belt comprising a knit belt and a drive roller with which the conveyor belt comprising this knit belt is driven.

6. A seamless conveyor belt comprising a seamless knit belt according to claim 5, wherein a gripping force, which is a force of friction between a conveyor belt comprising the knit belt and a conveyed object placed on or sandwiched by the conveyor belt comprising this knit belt, is such that at least one of elastic-fiber filament which is knitting yarn and monofilament constituting core yarn is shaped so as to be of modified cross-section; and a shape of the modified cross-section being a modified cross-sectional shape that causes increase in contact area with respect to at least one of a conveyed object that is placed on or sandwiched by the conveyor belt comprising the knit belt and a drive roller that drives a drive belt.

7. A seamless conveyor belt comprising a seamless knit belt according to any one of claims 4 through 6, wherein the knitting yarn comprises monofilament made up of core yarn and filament which is elastic fiber; at least one of the two being shaped so as to be of modified cross-section;

the knitting yarn being such that elastic fiber different from the core yarn comprises monofilament and includes elastic-fiber filament of melting point lower than a melting point of the core yarn;

flexural stress or heat causing the knitting yarn to undergo deformation at a time when this knitting yarn is used to knit the knit belt;

heat-setting moreover causing the low-melting-point elastic fiber to fuse to the core yarn;

a state in which knitting yarn intersects and is entangled is stabilized;

improvement of coefficient of friction of the knit belt and prevention of fraying of filament of knitting yarn at side ends and breakage of yarn due to abrasion of the knit belt being respectively achieved;

there being an increase in regions at which contact with a conveyed object occurs; and there being improvement in conveying force.

8. A seamless conveyor belt comprising a seamless knit belt according to claim 7, wherein knitting yarn of the seamless knit belt is knitting yarn in which monofilament constituting core yarn includes filament which is insulating or is a dielectric body and electrically conductive filament comprising artificial fiber;

flexural stress or heat causing this monofilament to undergo plastic deformation at locations of entanglement;

being knit in a knit pattern which is weft-knit or warp-knit;

the seamless knit belt which comprises conditions causing loops to have undergone deformation being such that it is a knit pattern in which pitch of loops in a stitch direction constituting an axial direction is smaller than pitch of loops in a gauge direction constituting a conveying direction;

at this knit pattern, mutual filament locations and mutual locations of mutually adjacent loops have undergone deformation and an entangled state of the filament is maintained, causing prevention of fraying of yarn at the knit belt during conveyance by the conveyor belt; pitch spacing of loops in the stitch direction is shortened;

shortening of this pitch spacing causing increase in strength in the conveying direction;

the knit belt comprising knitting yarn in which filament comprising a dielectric body or an insulating body covers the core yarn or in which plating yarn in which filament comprising a dielectric body or an insulating body is plated over the core yarn so as to prevent direct contact with the core yarn which comprises electrically conductive filament; this yarn with which the core yarn is covered or this yarn with which the core yarn is plated being provided thereover at the knit belt;

a desired gap being formed between the conveyed object and the core yarn comprising electrically conductive filament due to a thickness of the yarn comprising filament which is the dielectric body or the insulating body; and, at a conveyor apparatus at which this knit belt is used, the core yarn comprising electrically conductive filament from which the knit belt is constituted is made to be in one state among a state in which it is floating, a state in which it is grounded to earth, and a state in which a voltage is applied thereto.

9. A seamless conveyor belt comprising a seamless knit belt according to claim 8, wherein yarn which covers the core yarn or yarn with which the core yarn is plated at the seamless knit belt which is a conveyor belt is filament of flexible elastic fiber having a coefficient of friction higher than that of the core yarn and having a melting point lower than that of the core yarn;

flexural stress or heat at a time when the knit belt is being knit causing the knitting yarn to deform;

heat-setting following knitting causing filament of this elastic fiber to fuse to the core yarn;

the intersecting and entangled state of the knitting yarn which comprises filament being stabilized; and the knitting yarn being such as to permit achievement of prevention of fraying of knitting yarn at side ends of the knit belt, and improvement in coefficient of friction at the knit belt, and electrostatic holding of a conveyed object thereto or removal of charge from a conveyed object by means of electrical action as a result of causing the core yarn which is electrically conductive filament at the knit belt to be in one state among a state in which it is floating, a state in which it is grounded to earth, and a state in which a voltage is applied thereto.

10. A seamless conveyor belt comprising a seamless knit belt according to claim 1, wherein prevention of upward curling of side ends of the knit belt comprises an entangled state of yarn comprising filament; and projecting portions due to said entanglement being arranged at least at the back surface, or being arranged at the front surface and the back surface, of the knit belt.

11. A seamless drive belt comprising a seamless knit belt wherein a seamless knit belt which has been knit with pitch of prescribed gauge and on the back surface of which there are provided projecting regions which are due to entanglement of knitting yarn in knit fabric at which mutual monofilament locations are mutually intertwined at a seamless conveyor belt comprising a knit belt according to claim 3 is such that diameter of knitting yarn causes formation of a height of a projecting region at the back surface of an entangled region;

this height of the projecting region at the back surface causes a step to be provided between it and a non-entangled region;

a groove that engages with the projecting region formed by intertwining of knitting yarn at the projecting region on the back surface of this seamless knit belt is arranged on a drive roller by which the knit belt is driven as a result of this step that is provided at the back surface; and the knit belt is formed into a knit belt which is a drive belt for transmission of drive force as a result of engagement between the groove which is arranged on this drive roller and the projecting region at the entangled region of this seamless knit belt.

12. A drive belt comprising:
a seamless knit belt, which is a knit belt forming a drive belt that transmits drive force as a result of engagement between a groove formed in a drive roller and a projecting region at an entangled region of the seamless knit belt is a knit belt comprising knitting yarn containing a plurality of materials;
monofilament made up of continuous fiber being used at knitting yarn which is filament constituting core yarn;
being a seamless knit belt comprising knit fabric chosen from among plating using a core yarn and filament of material different from this core yarn for plating thereof;
knitting knitted using knitting yarn which is twisted yarn in which there is a core yarn and filament of material different from this core yarn for twisting therewith; and
knitting using knitting yarn which is covered yarn in which a core yarn is covered by filament of material different from this core yarn; and
comprising a seamless knit belt in which a front surface of this knit belt and a back surface of this knit belt have different coefficients of friction or a seamless knit belt in which the front surface of the knit belt and the back surface of the knit belt have more or less the same coefficient of friction; and
being comprised of a knit belt having improved force of friction (gripping characteristics) as a result of the fact that filament having higher coefficient of friction than a core yarn has been used as plating yarn to plate the core yarn, has been used as a result of having been included within twisting yarn, or has been used as covering yarn, so as to increase force of friction (gripping characteristics) with respect to a pulley or roller by which drive force is transmitted by a belt and drive pulley or drive roller and said knit belt.

13. A conveyor apparatus employing a seamless conveyor belt comprising seamless knit fabric according to claim 1, wherein the conveyor belt is applied for use in an apparatus having conveyor means that causes an object to be conveyed.

* * * * *